(12) United States Patent
Hawksley

(10) Patent No.: US 10,647,192 B2
(45) Date of Patent: May 12, 2020

(54) HYBRID POWER SYSTEM

(71) Applicant: Graeme Eric Hawksley, Sandown (GB)

(72) Inventor: Graeme Eric Hawksley, Sandown (GB)

( * ) Notice: Subject to any disclaimer, the term of this patent is extended or adjusted under 35 U.S.C. 154(b) by 231 days.

(21) Appl. No.: 15/527,256

(22) PCT Filed: Nov. 24, 2015

(86) PCT No.: PCT/GB2015/000318
§ 371 (c)(1),
(2) Date: May 16, 2017

(87) PCT Pub. No.: WO2016/083770
PCT Pub. Date: Jun. 2, 2016

(65) Prior Publication Data
US 2017/0355258 A1    Dec. 14, 2017

(30) Foreign Application Priority Data

Nov. 25, 2014 (GB) .................................. 1420899.5

(51) Int. Cl.
    *B60K 6/442*      (2007.10)
    *B60K 6/40*      (2007.10)
    (Continued)

(52) U.S. Cl.
CPC ................ *B60K 6/442* (2013.01); *B60K 6/40* (2013.01); *B60L 50/16* (2019.02); *B60L 50/61* (2019.02); *B63H 21/20* (2013.01); *B63H 23/12* (2013.01); *B63H 23/18* (2013.01); *B63J 3/02* (2013.01); *F02B 61/04* (2013.01); *F02B 63/04* (2013.01); *H02K 7/108* (2013.01); *B60L 2200/32* (2013.01); *B60L 2260/26* (2013.01); *B63H 23/16* (2013.01); *B63H 2021/205* (2013.01); *B63H 2023/0208* (2013.01);
(Continued)

(58) Field of Classification Search
CPC .................................. B60K 6/442; B60K 6/40
USPC ................................................ 74/661, 665 E
See application file for complete search history.

(56) References Cited

U.S. PATENT DOCUMENTS 7,490,685 B2 * 2/2009 Aoki .................. B60K 6/44
                                                            180/65.28
8,307,924 B2 * 11/2012 Wang .................. B60L 50/61
                                                            180/65.23
(Continued)

FOREIGN PATENT DOCUMENTS

GB      2514183 A    11/2014
SU      380531        5/1973
(Continued)

*Primary Examiner* — Ha Dinh Ho
(74) *Attorney, Agent, or Firm* — Christopher M. Ramsey; GrayRobinson, P.A.

(57) ABSTRACT

A hybrid power system has an internal combustion engine, a gear box having an input connectable to the engine and an output shaft to drive a vehicle, a first power drive and take off releasably connectable to the gear box input, a second power drive and take off releasably connectable to the gear box output, at least one motor/generator connected the first and/or second power drive and take off, a connecting clutch releasably connecting the first and second power drive and take off, and a battery to power or be charged by the or each motor generator.

11 Claims, 31 Drawing Sheets

(51) Int. Cl.
  *B63H 21/20* (2006.01)
  *B63H 23/12* (2006.01)
  *B63H 23/18* (2006.01)
  *B60L 50/16* (2019.01)
  *B63J 3/02* (2006.01)
  *B60L 50/61* (2019.01)
  *F02B 61/04* (2006.01)
  *F02B 63/04* (2006.01)
  *H02K 7/108* (2006.01)
  *B63H 23/02* (2006.01)
  *B63J 3/04* (2006.01)
  *B63H 23/16* (2006.01)

(52) U.S. Cl.
  CPC ...... *B63J 2003/046* (2013.01); *Y02T 70/5236* (2013.01); *Y02T 70/70* (2013.01); *Y10S 903/93* (2013.01)

(56) References Cited

U.S. PATENT DOCUMENTS

| | | | | |
|---|---|---|---|---|
| 8,574,120 | B2* | 11/2013 | Saito | F16H 37/065 477/5 |
| 8,731,760 | B2* | 5/2014 | Nishinakamura | B60W 10/02 701/22 |
| 9,114,699 | B2* | 8/2015 | Takei | B60K 6/365 |
| 9,321,344 | B2* | 4/2016 | Kim | B60K 6/50 |
| 10,017,040 | B2* | 7/2018 | Hata | B60K 6/365 |
| 2013/0157807 | A1* | 6/2013 | Saito | F16H 37/065 477/5 |

FOREIGN PATENT DOCUMENTS

| | | |
|---|---|---|
| SU | 385826 | 6/1973 |
| SU | 463587 | 3/1975 |
| WO | 0104477 | 1/2001 |

* cited by examiner

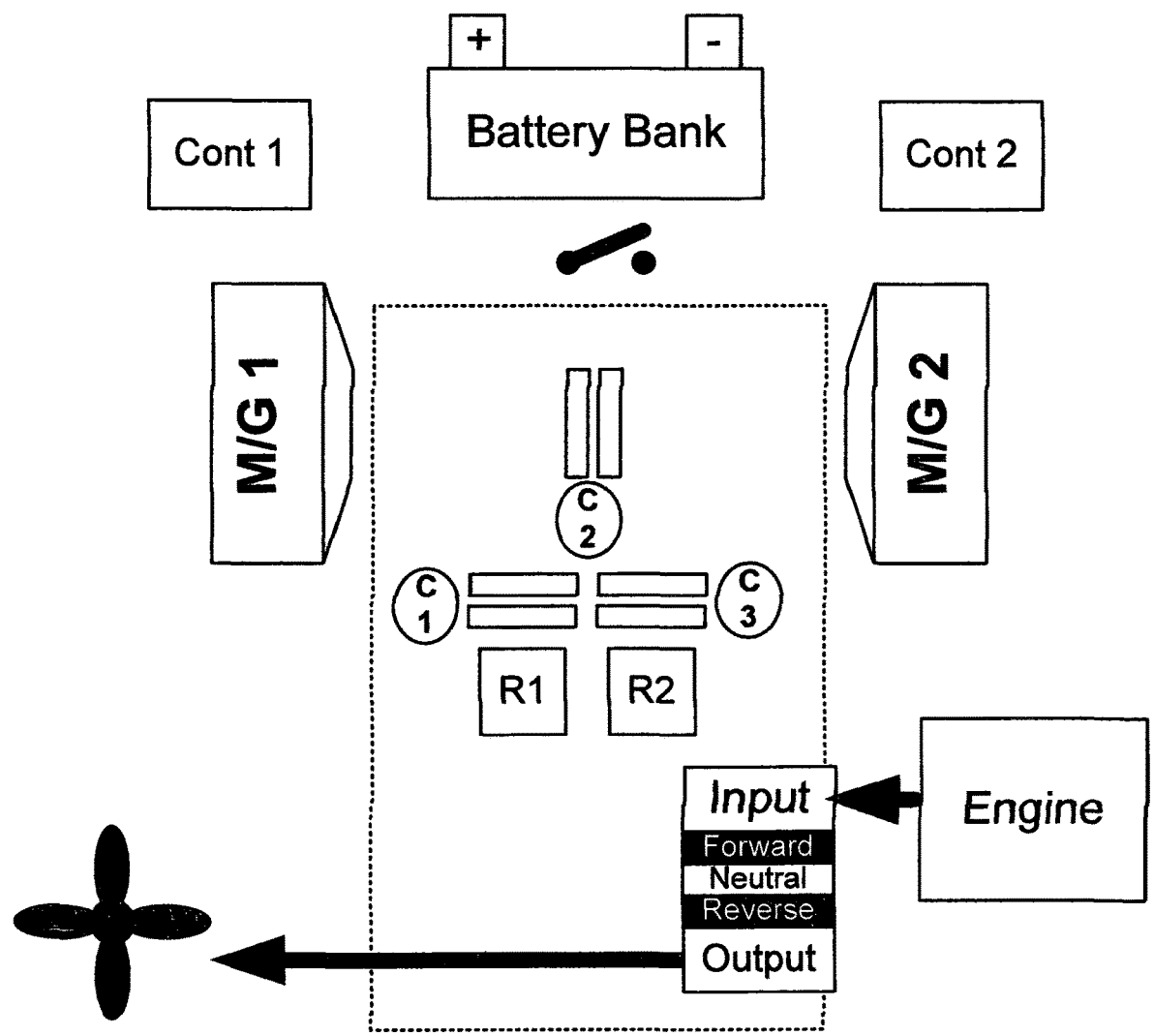
Fig 4, Engine only mode 1

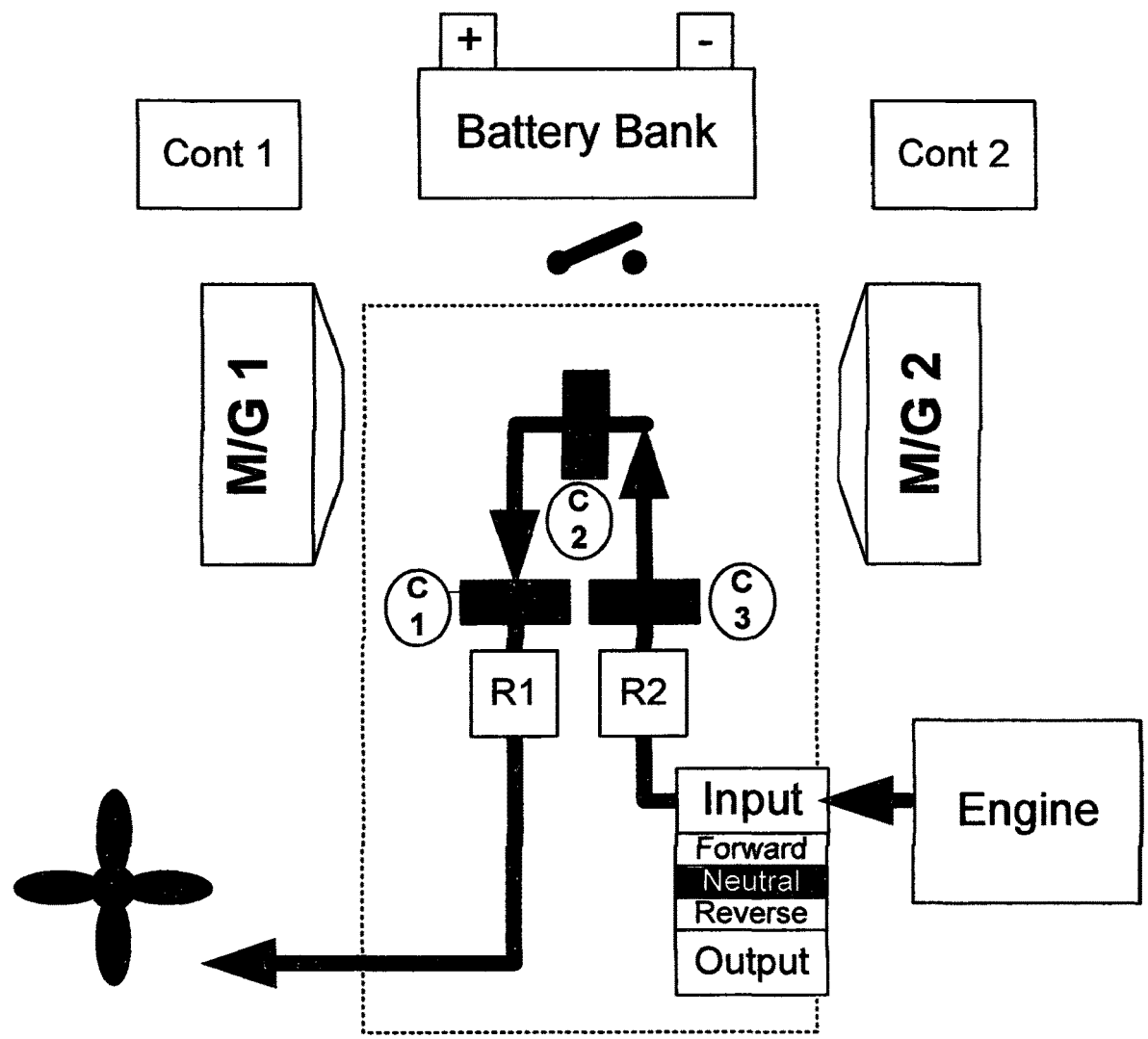
Fig 5, Gearbox circumvent mode

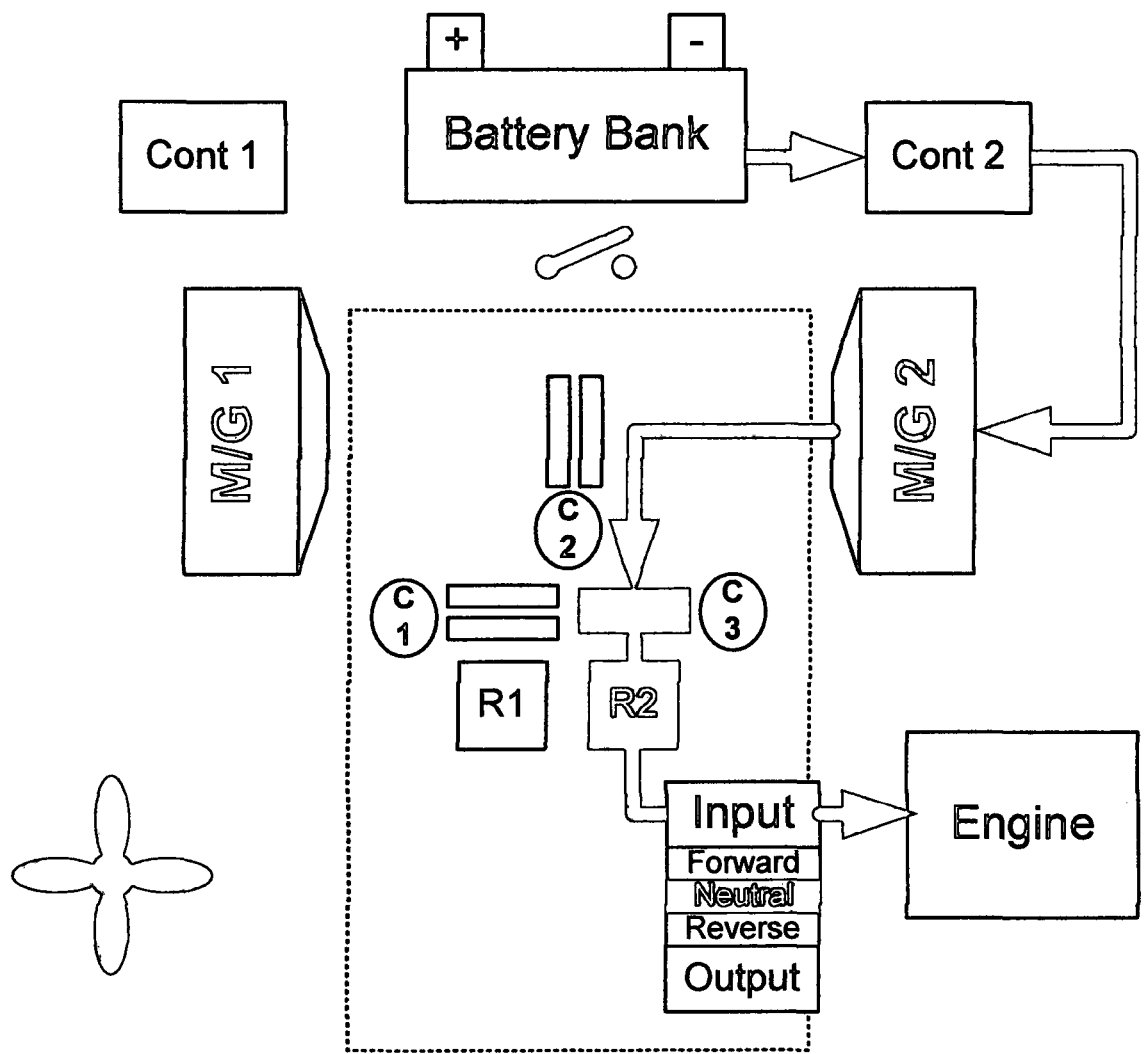
Fig 6, Emergency start mode

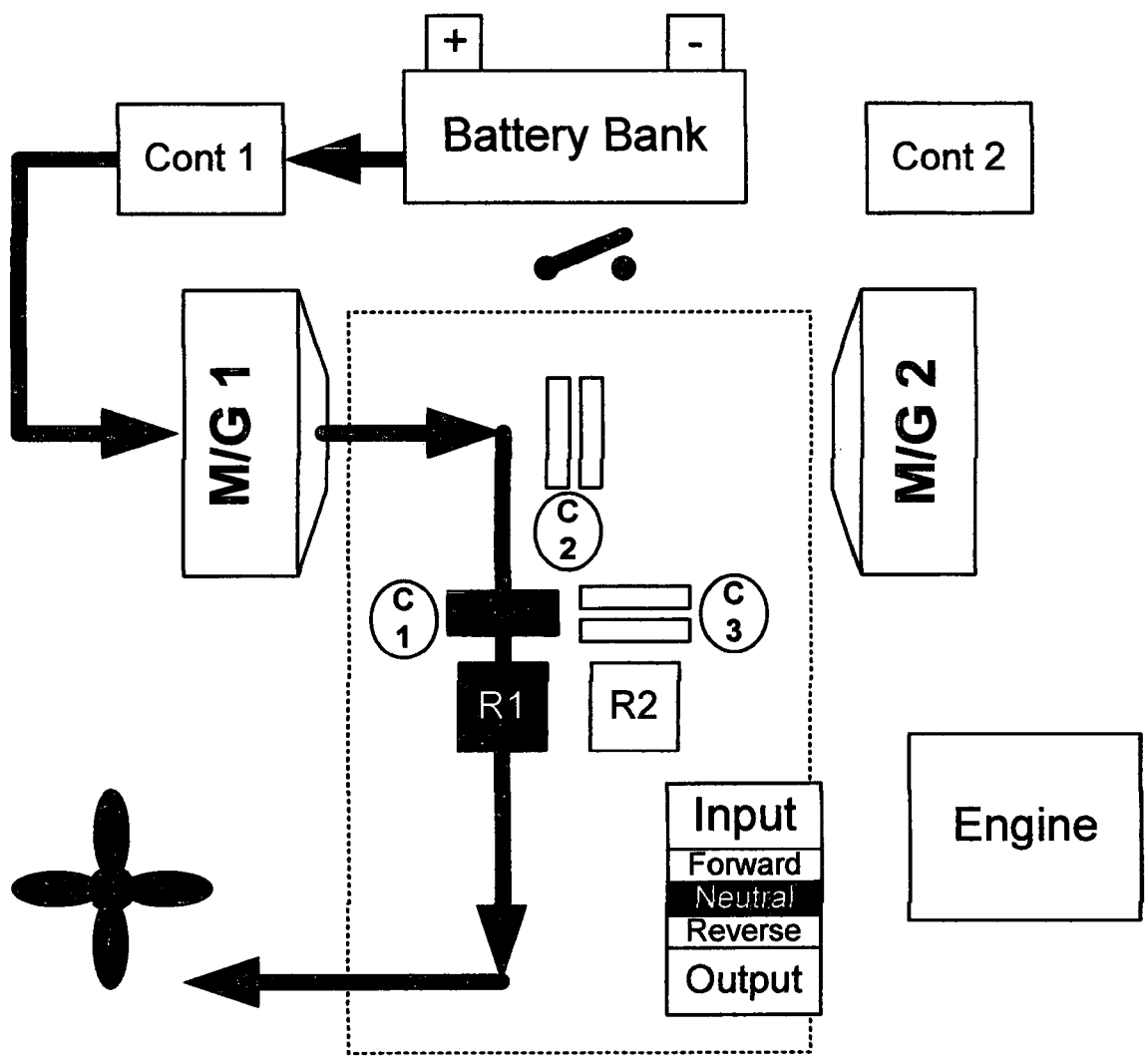
Fig 7, Electric drive mode 1

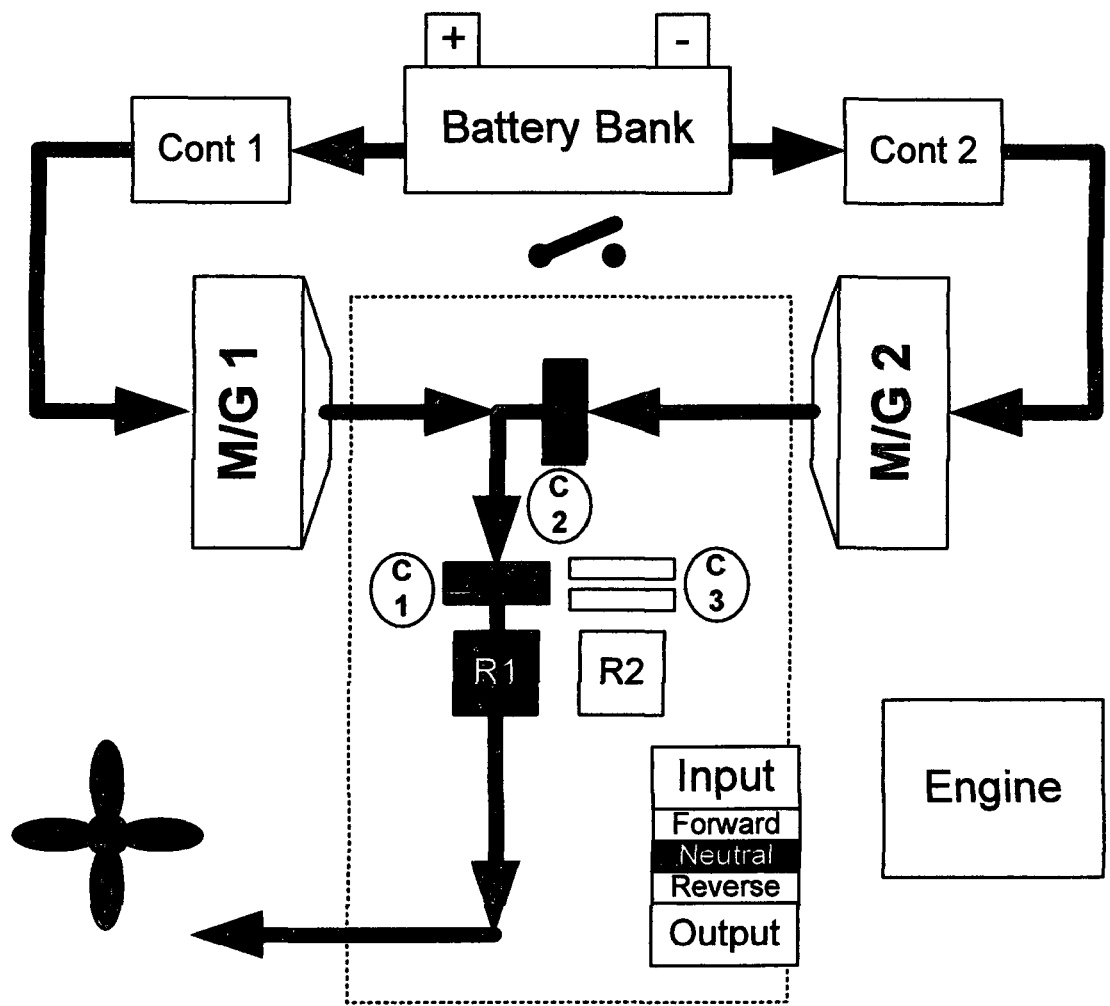
Fig 8, Electric drive mode 2

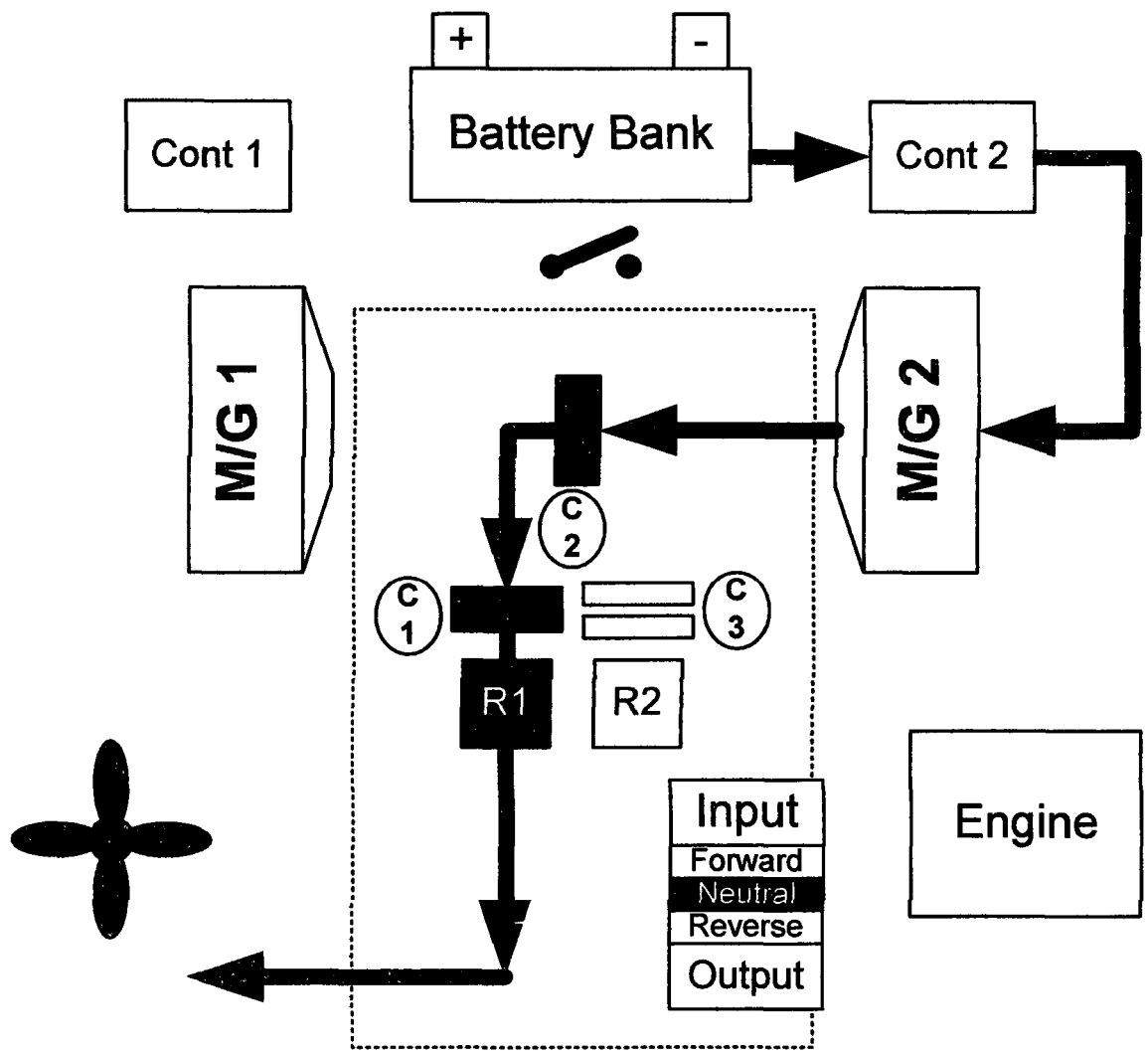
Fig 9, Electric drive mode 3

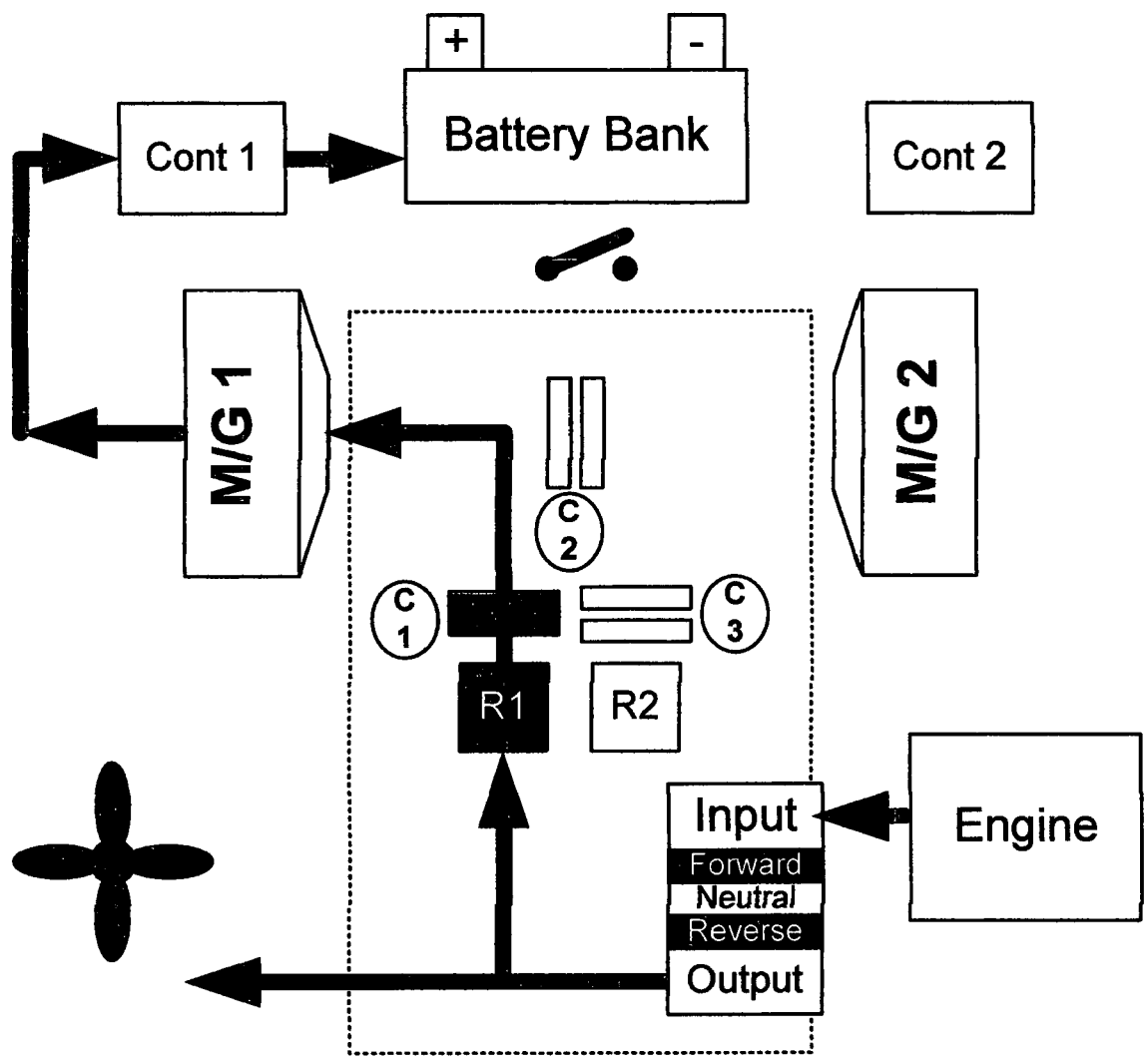
Fig 10, Drive & Generate mode 1

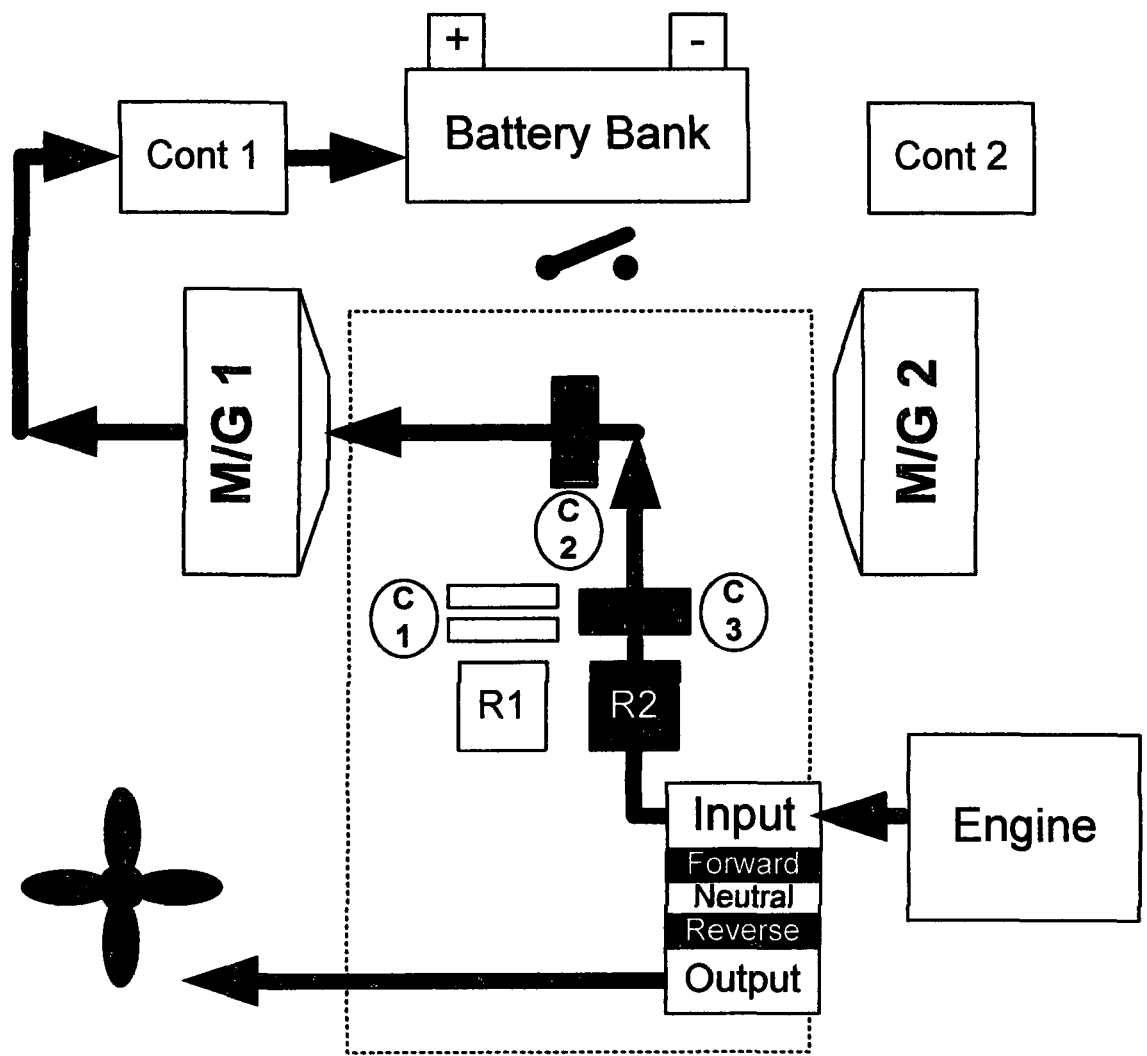
Fig 11,Drive & Generate mode 2

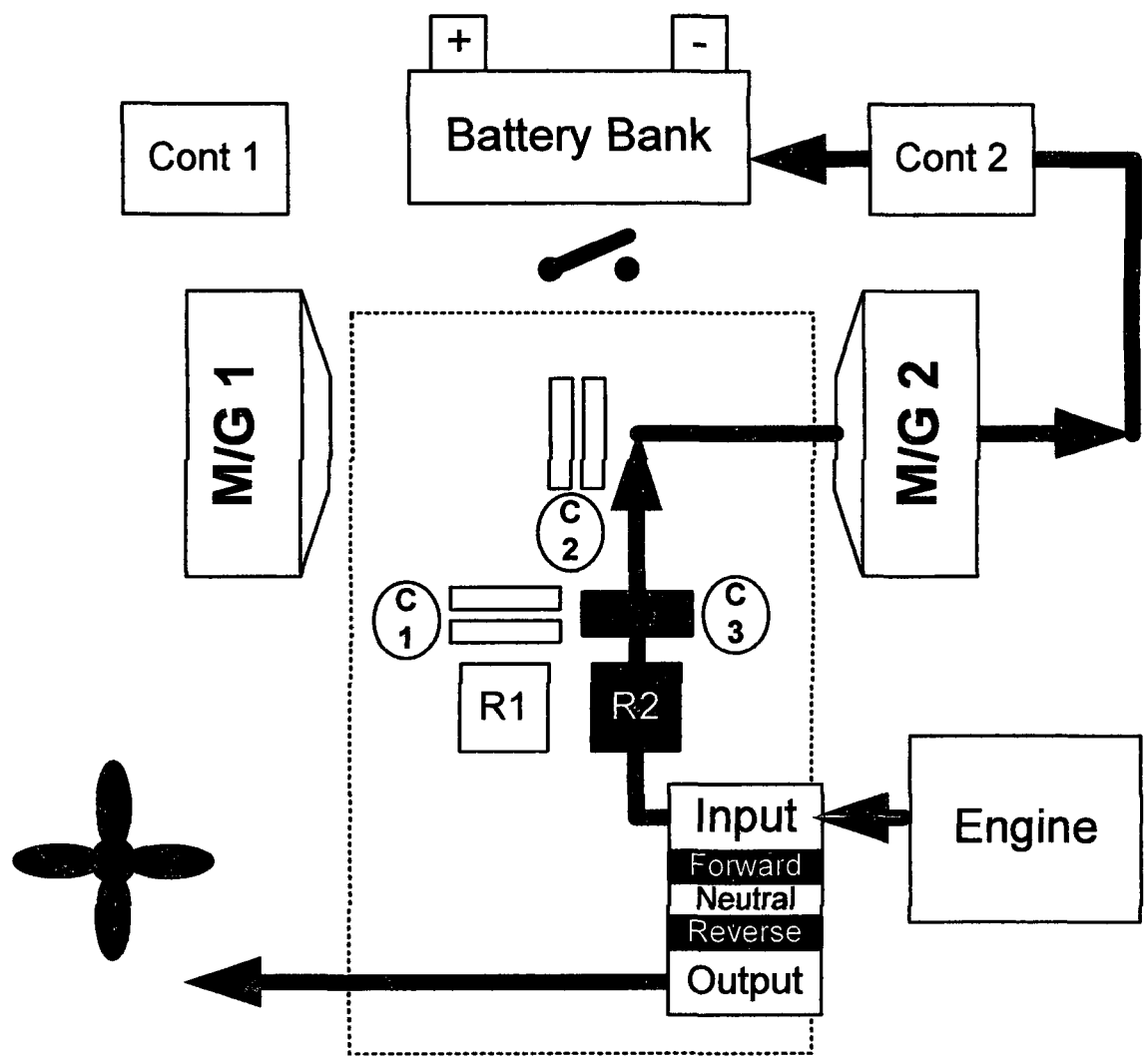
Fig 12, Drive & Generate mode 3

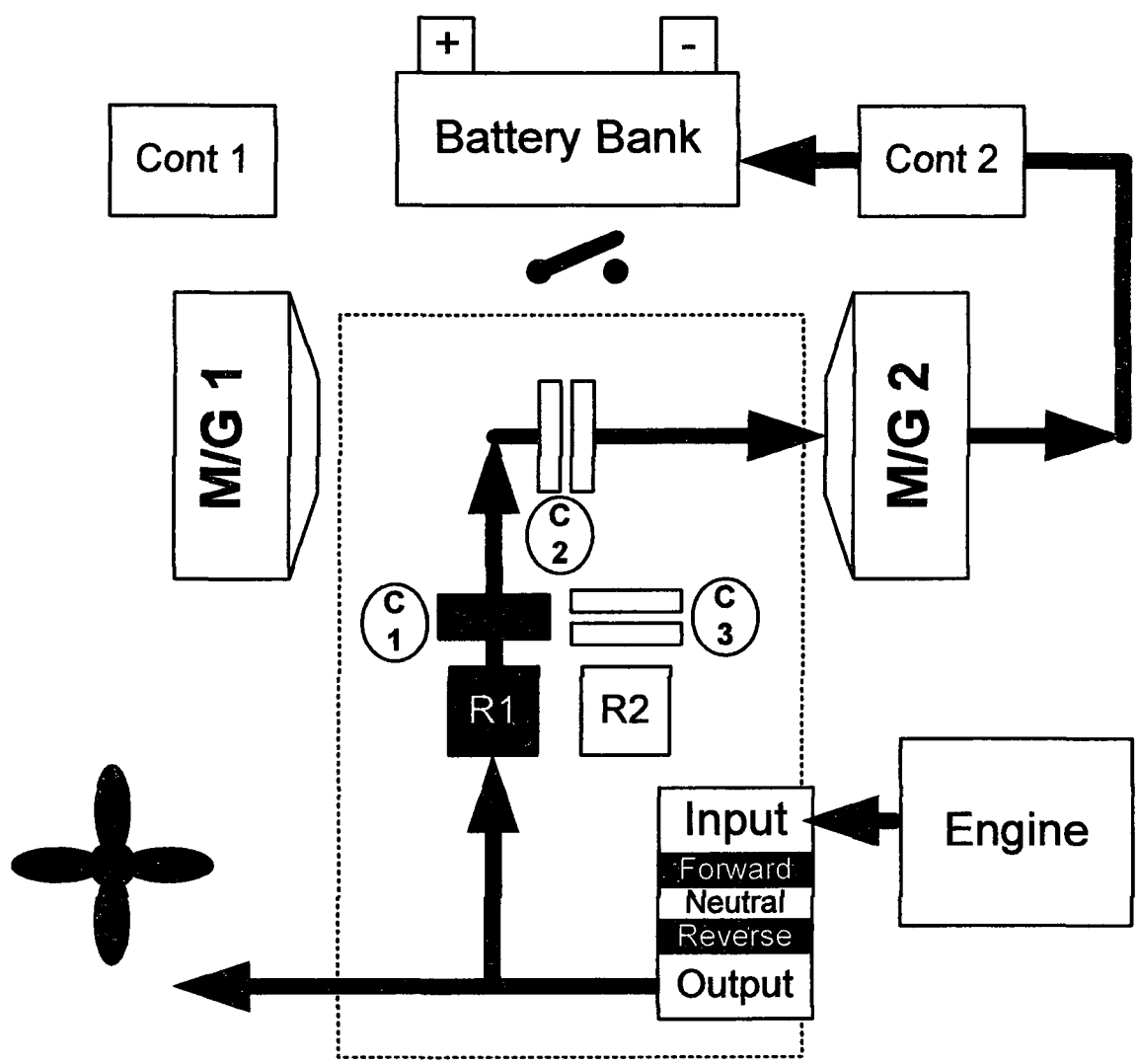
Fig 13, Drive & Generate mode 4

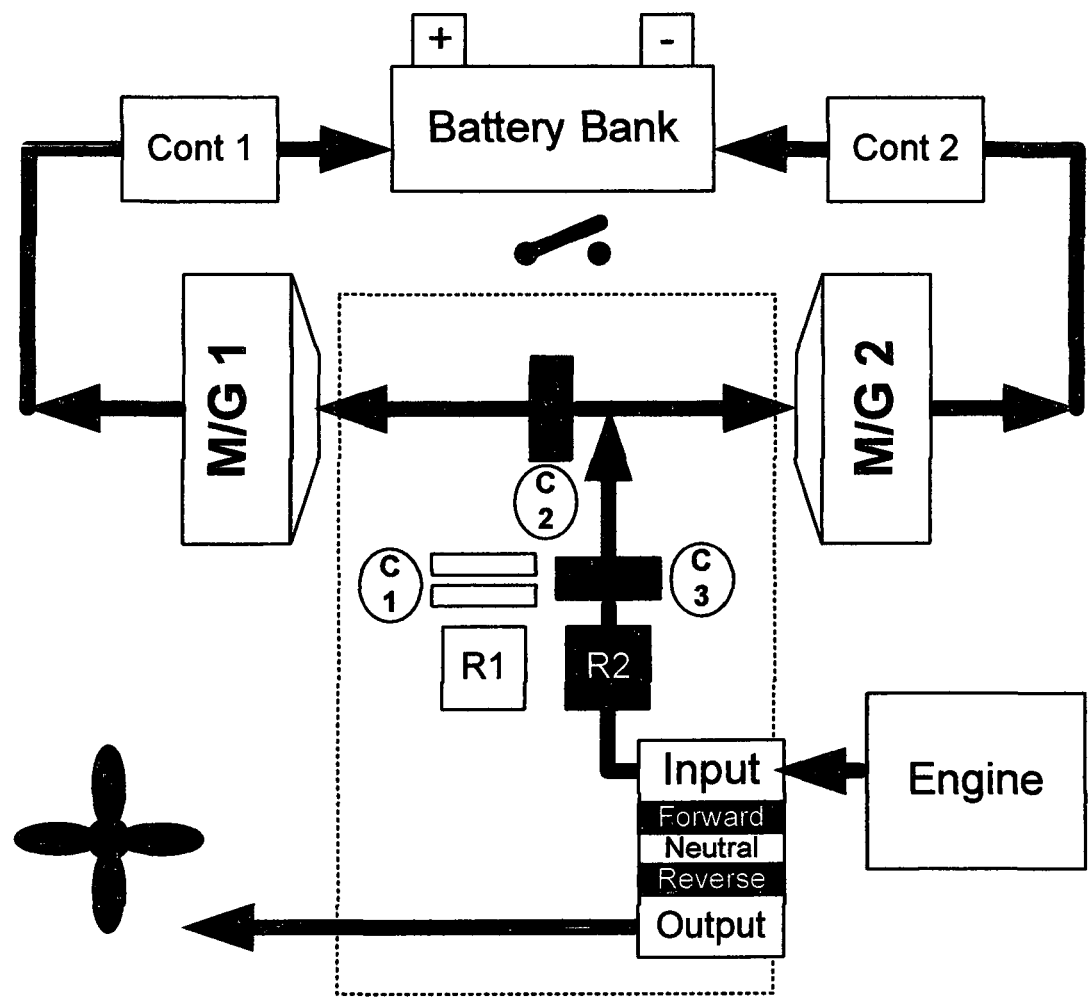
Fig 14, Drive & Generate mode 5

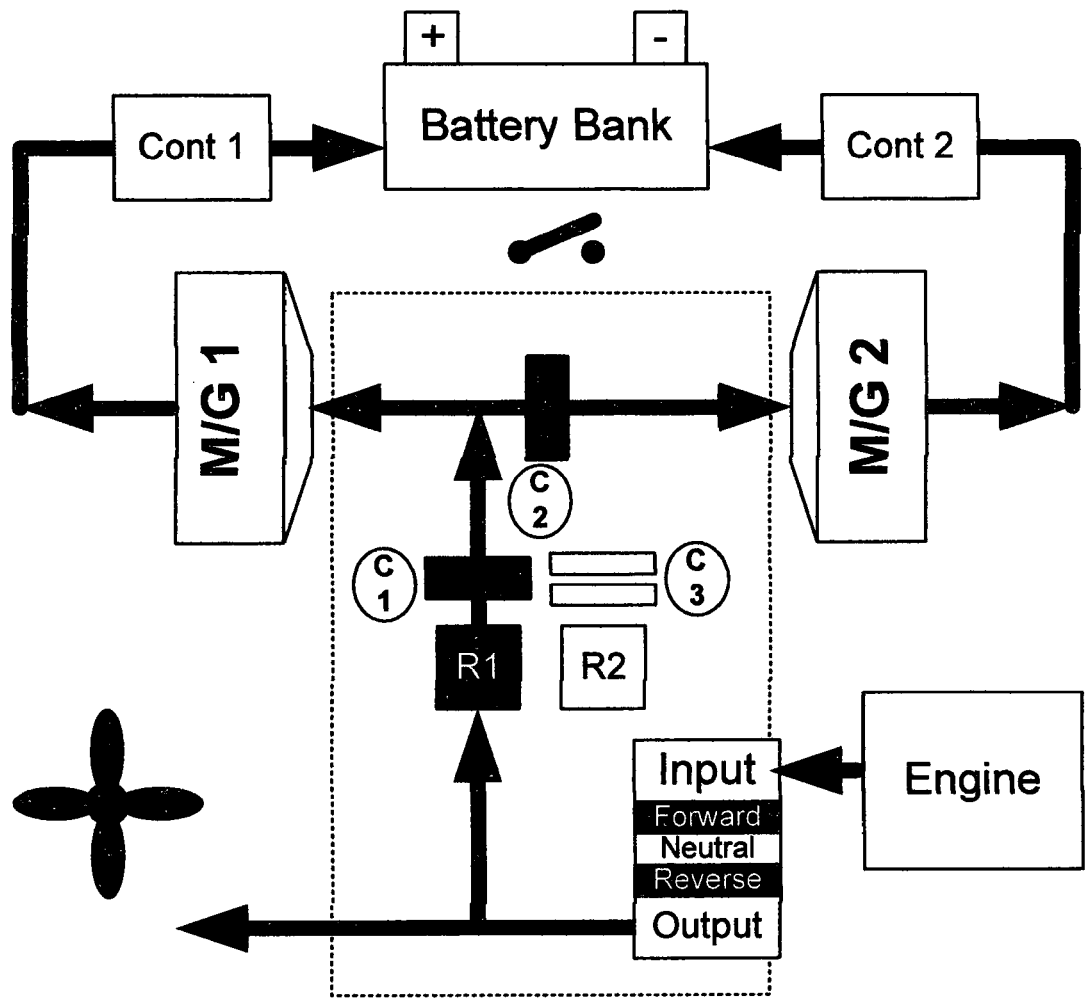
Fig 15, Drive & Generate mode 6

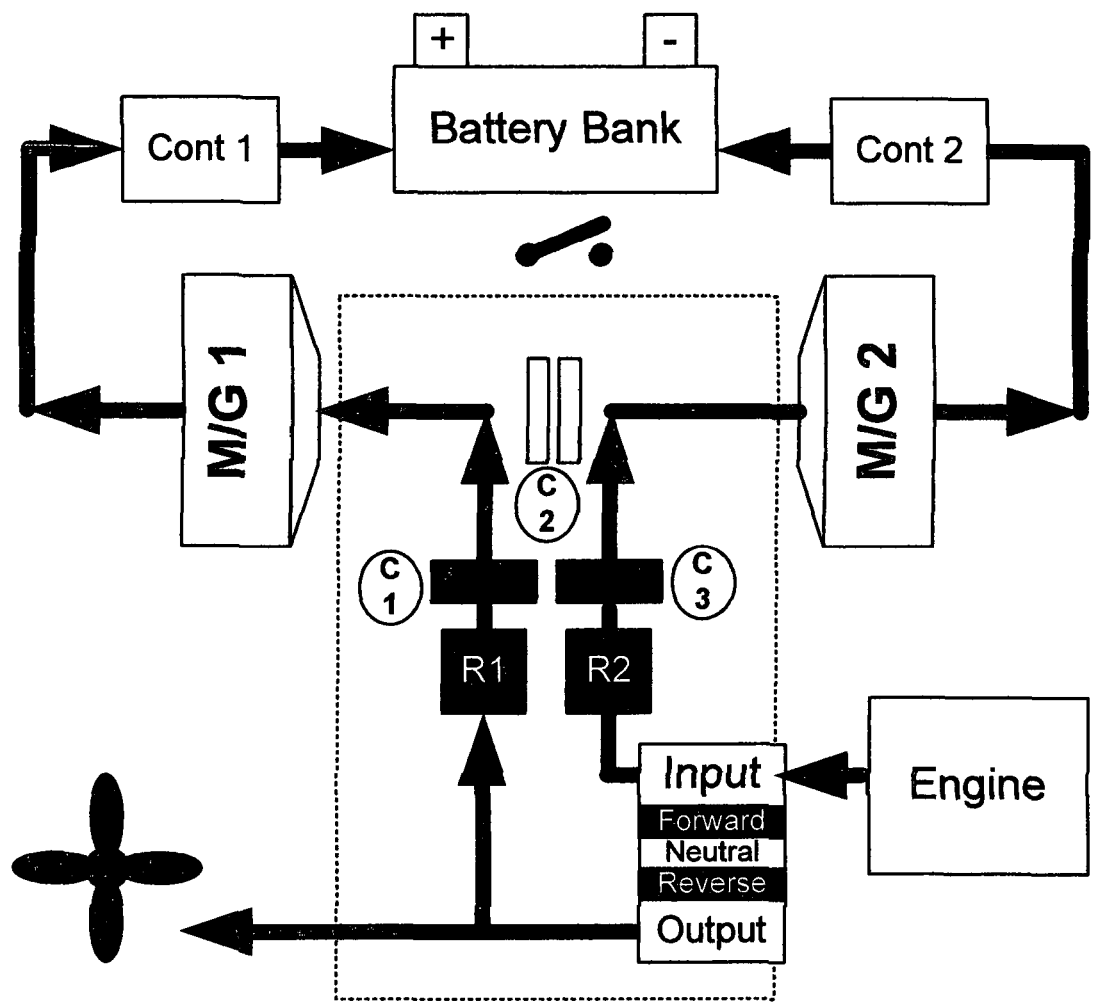
Fig 16, Drive & Generate mode 7

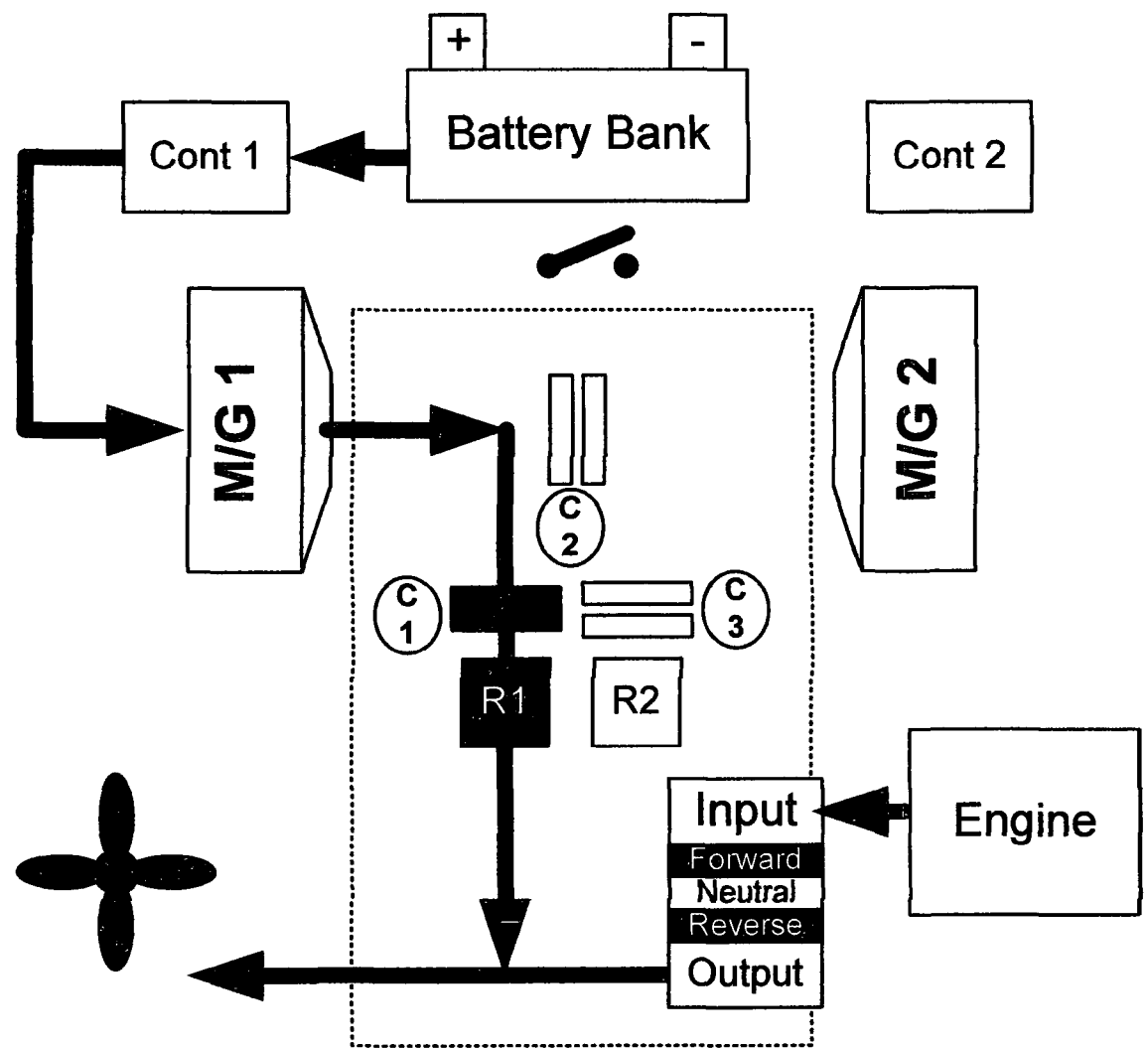
Fig 17, Engine boost mode 1

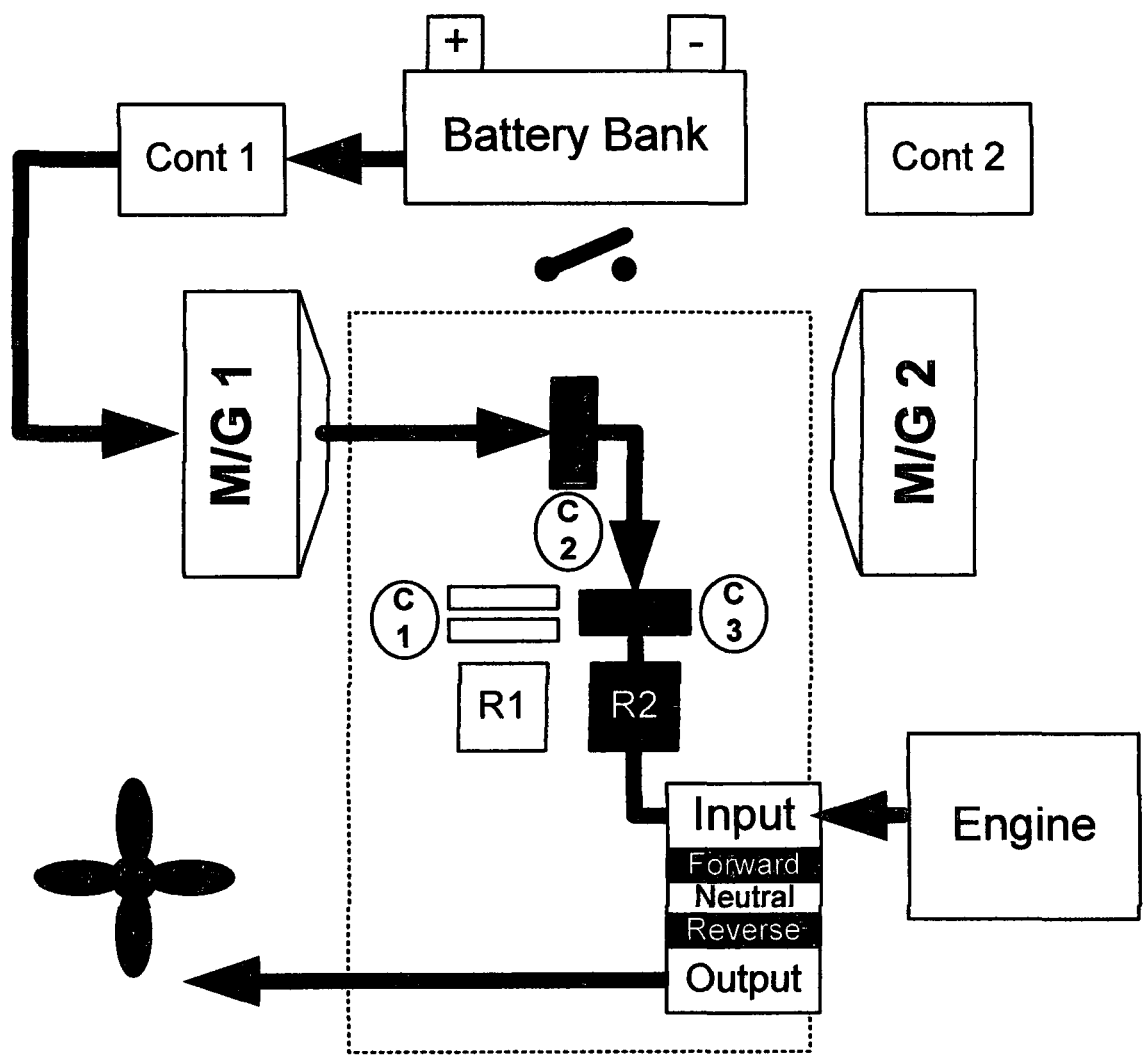
Fig 18, Engine boost mode 2

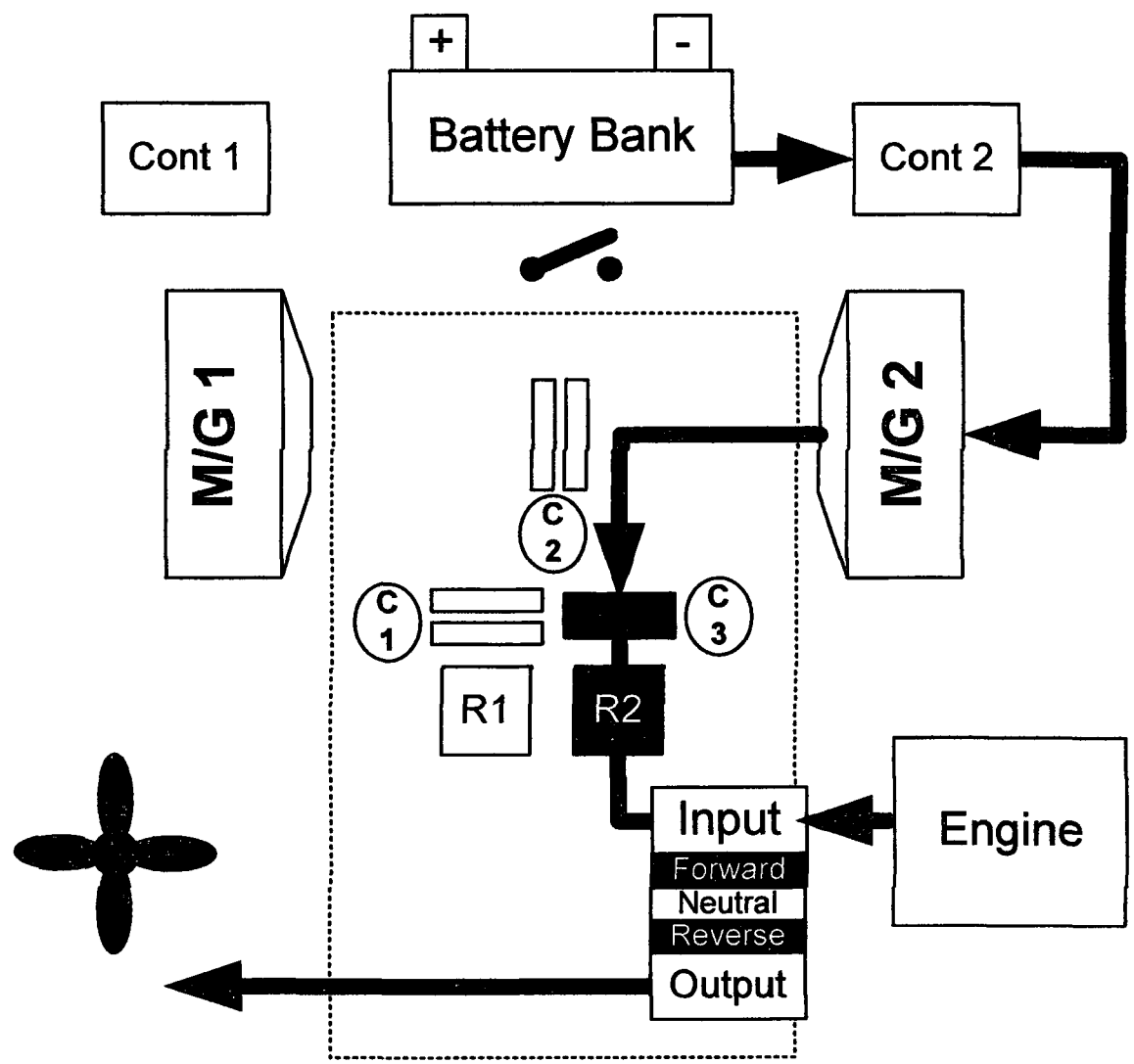
Fig 19, Engine boost mode 3

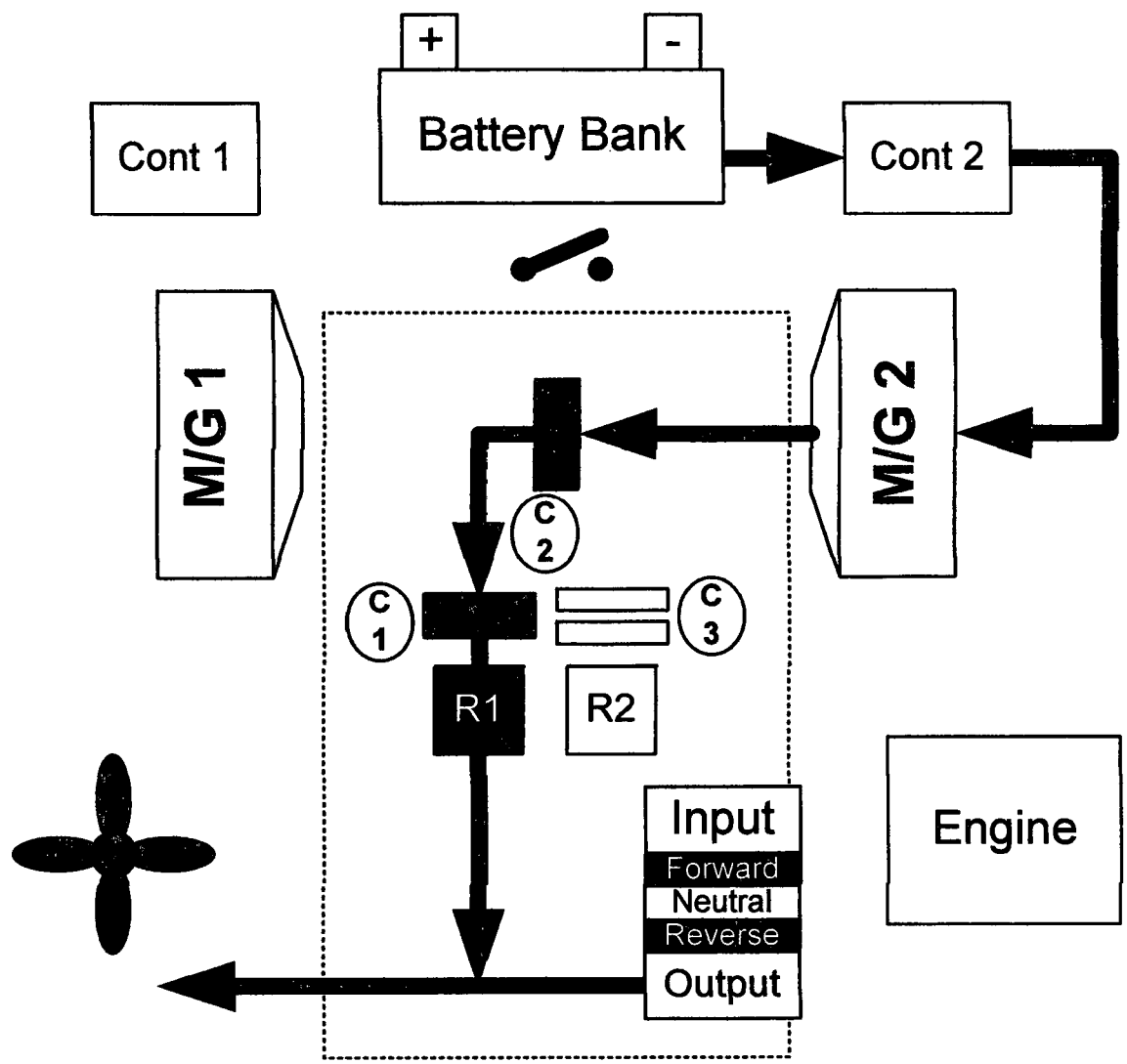
Fig 20 Engine boost mode 4

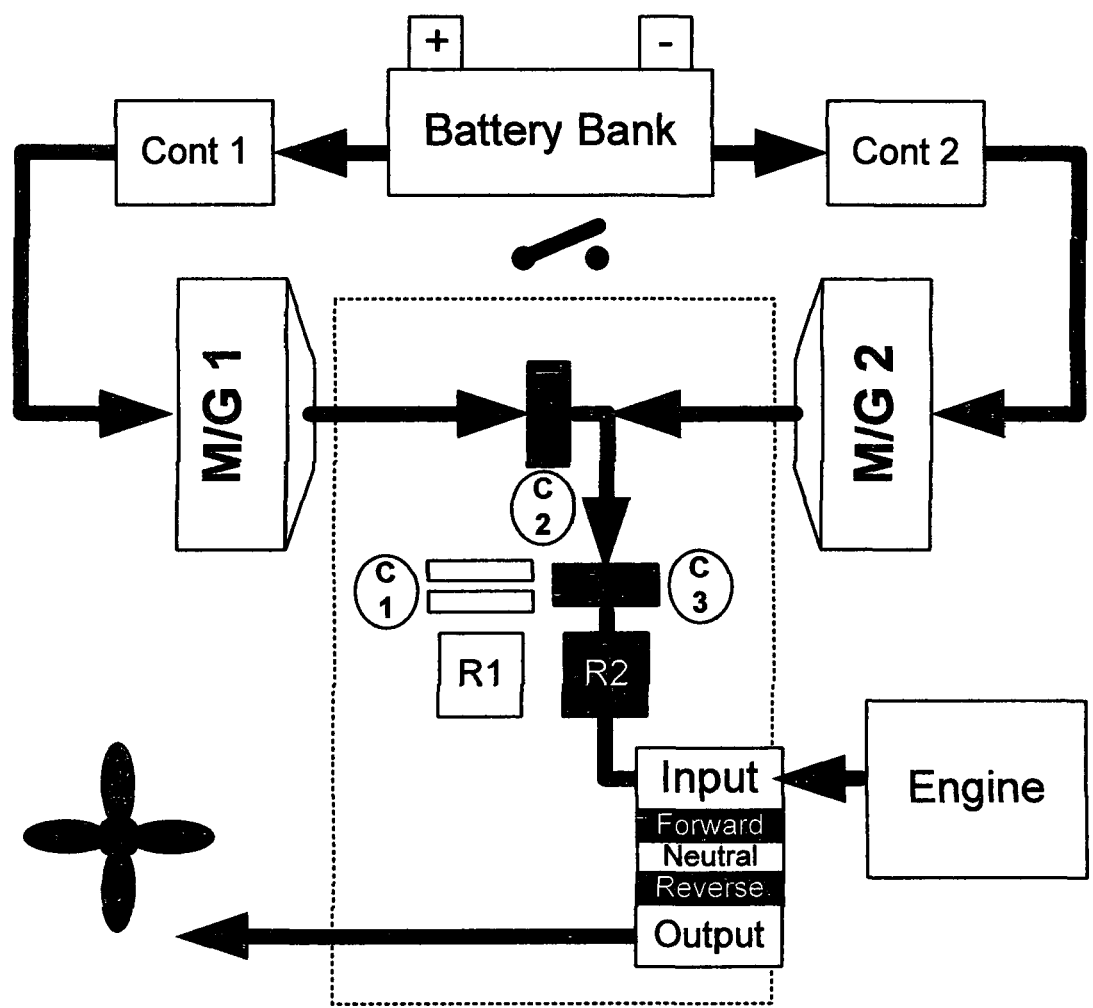
Fig 21, Engine boost mode 5

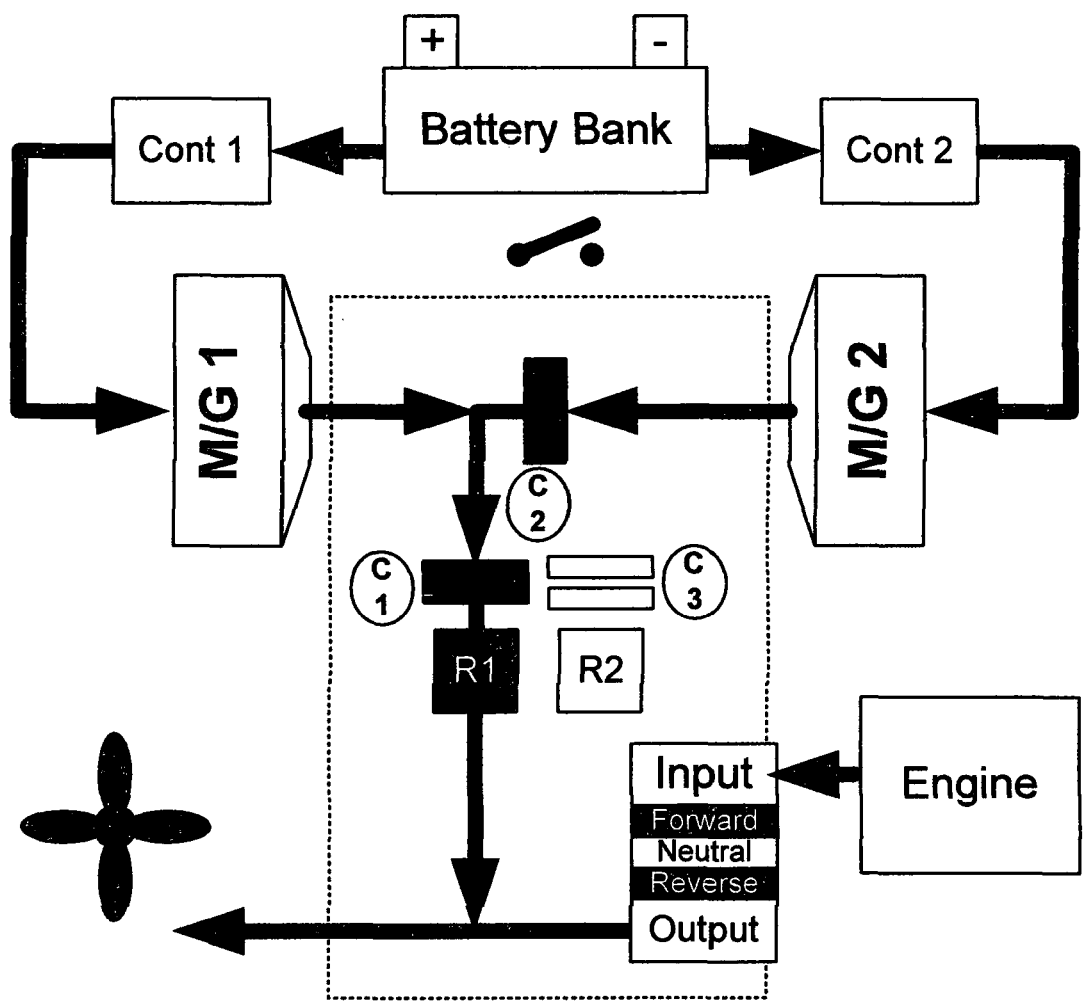
Fig 22 Engine boost mode 6

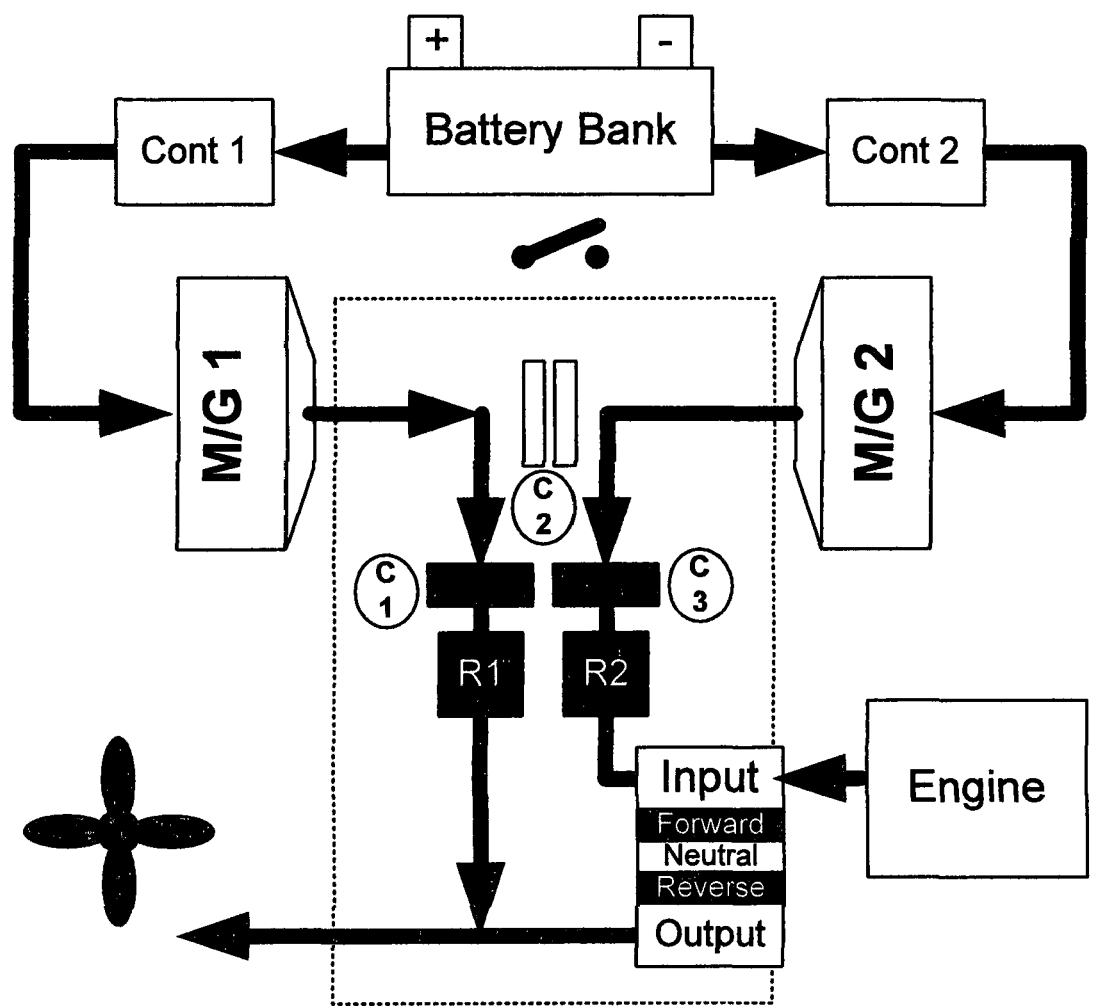
Fig 23, Engine boost mode 7

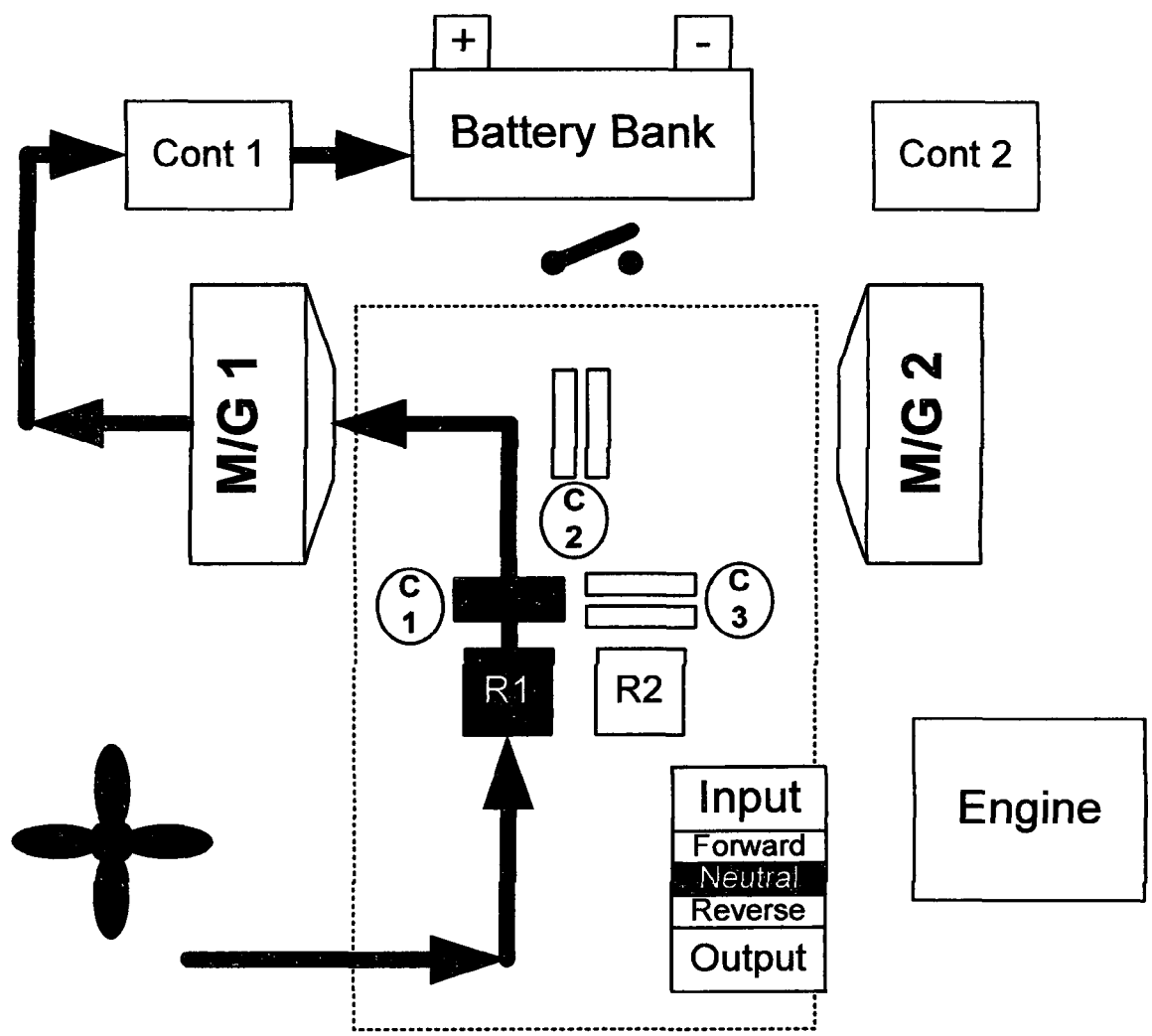
Fig 24, Regeneration mode 1

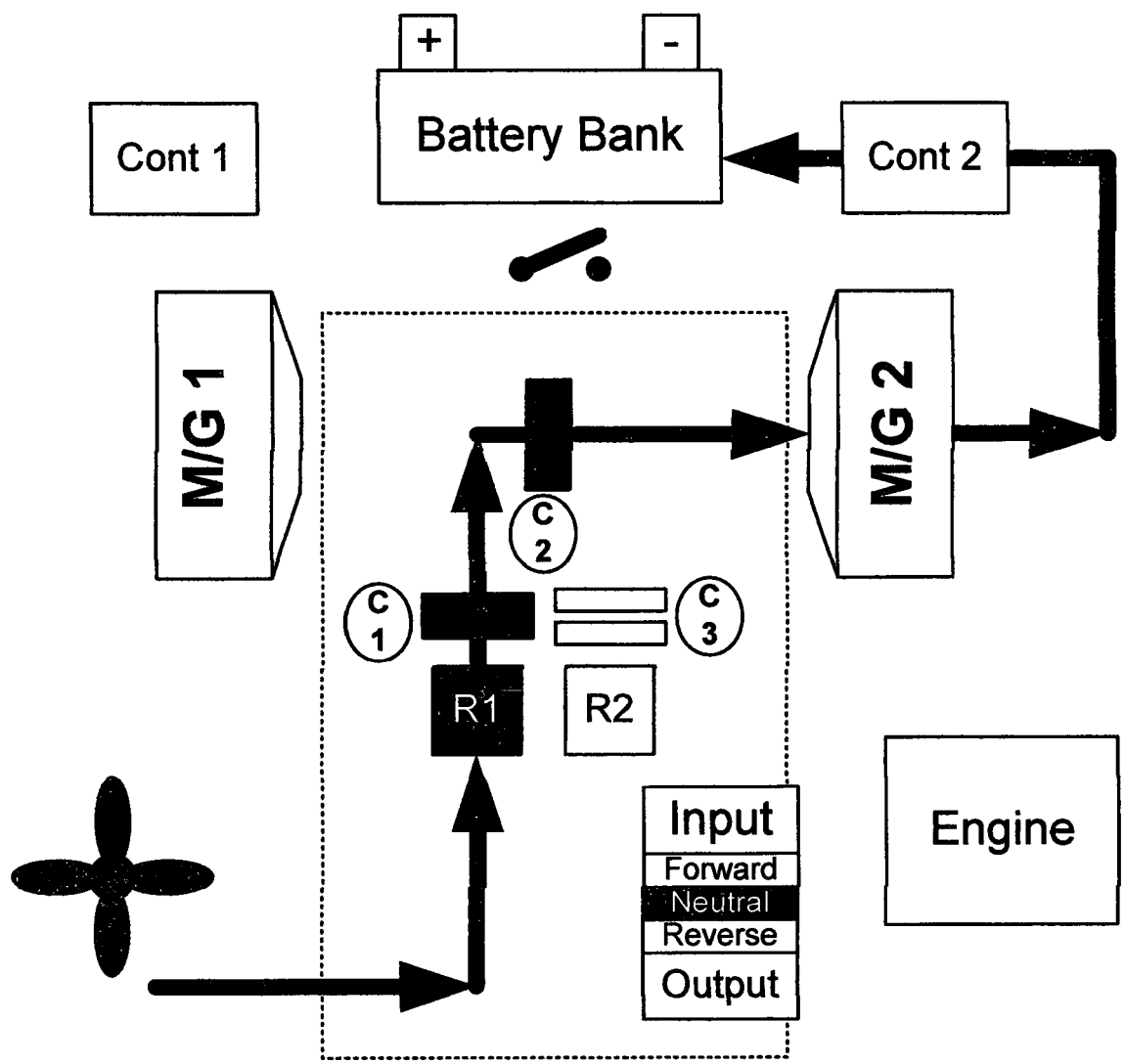
Fig 25, Regeneration mode 2

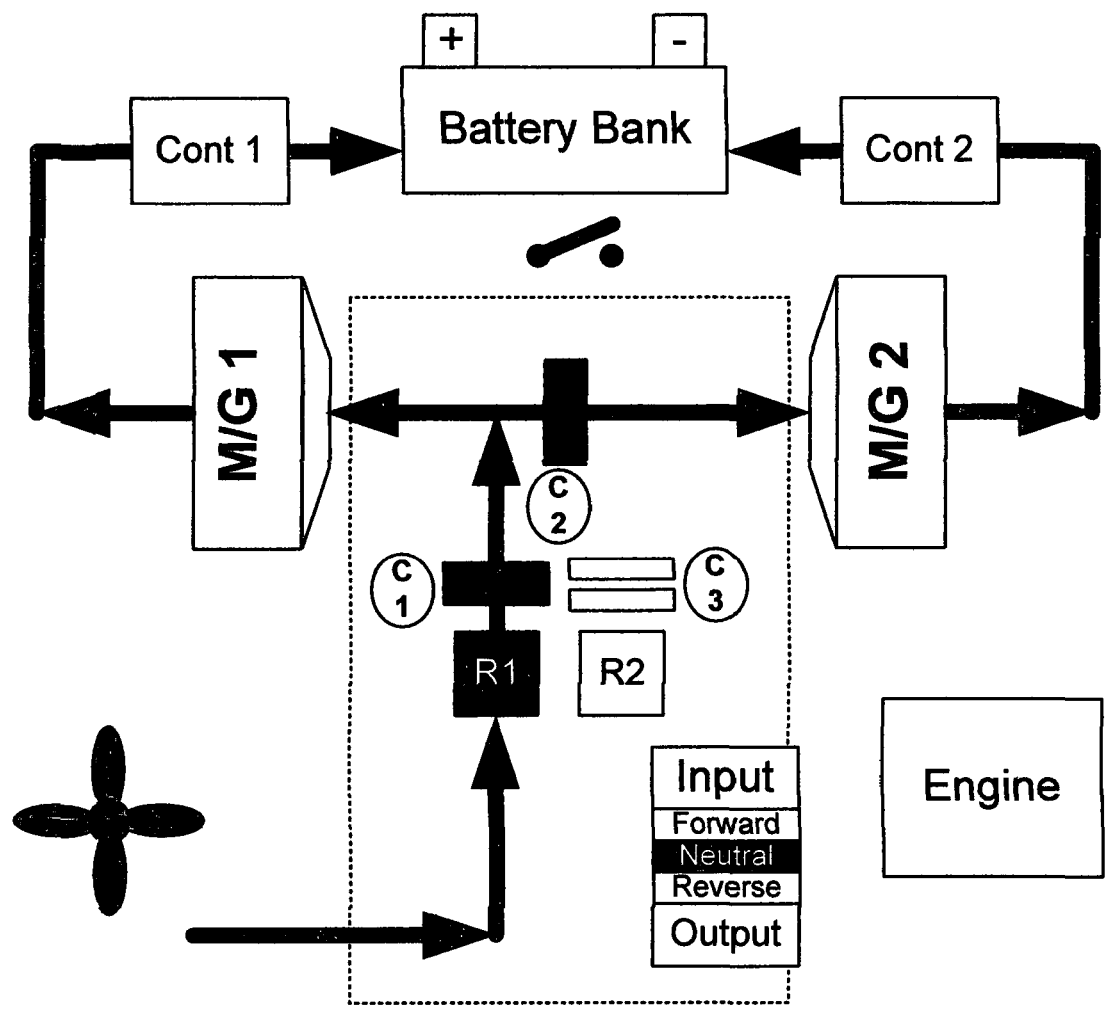
Fig 26, Regeneration mode 3

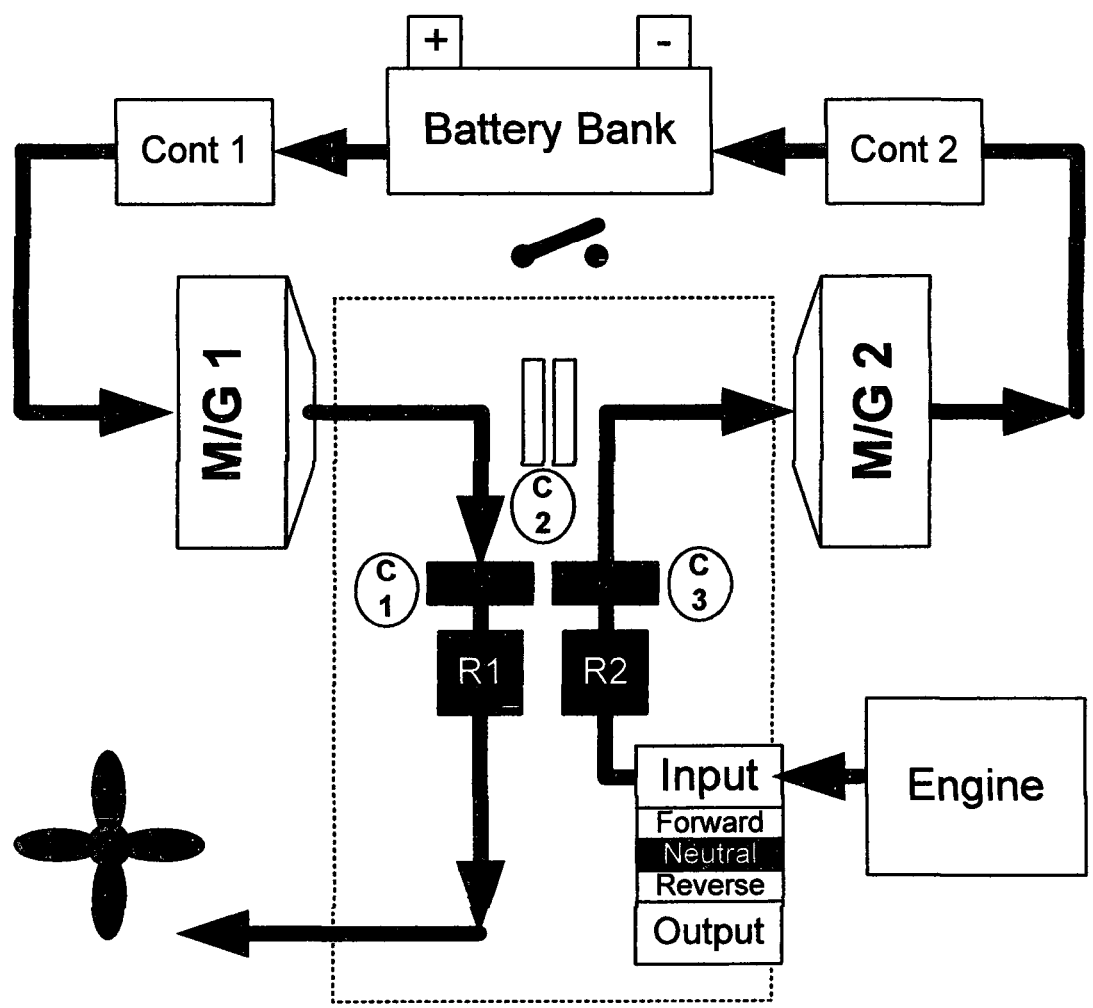
Fig 27, Serial hybrid mode

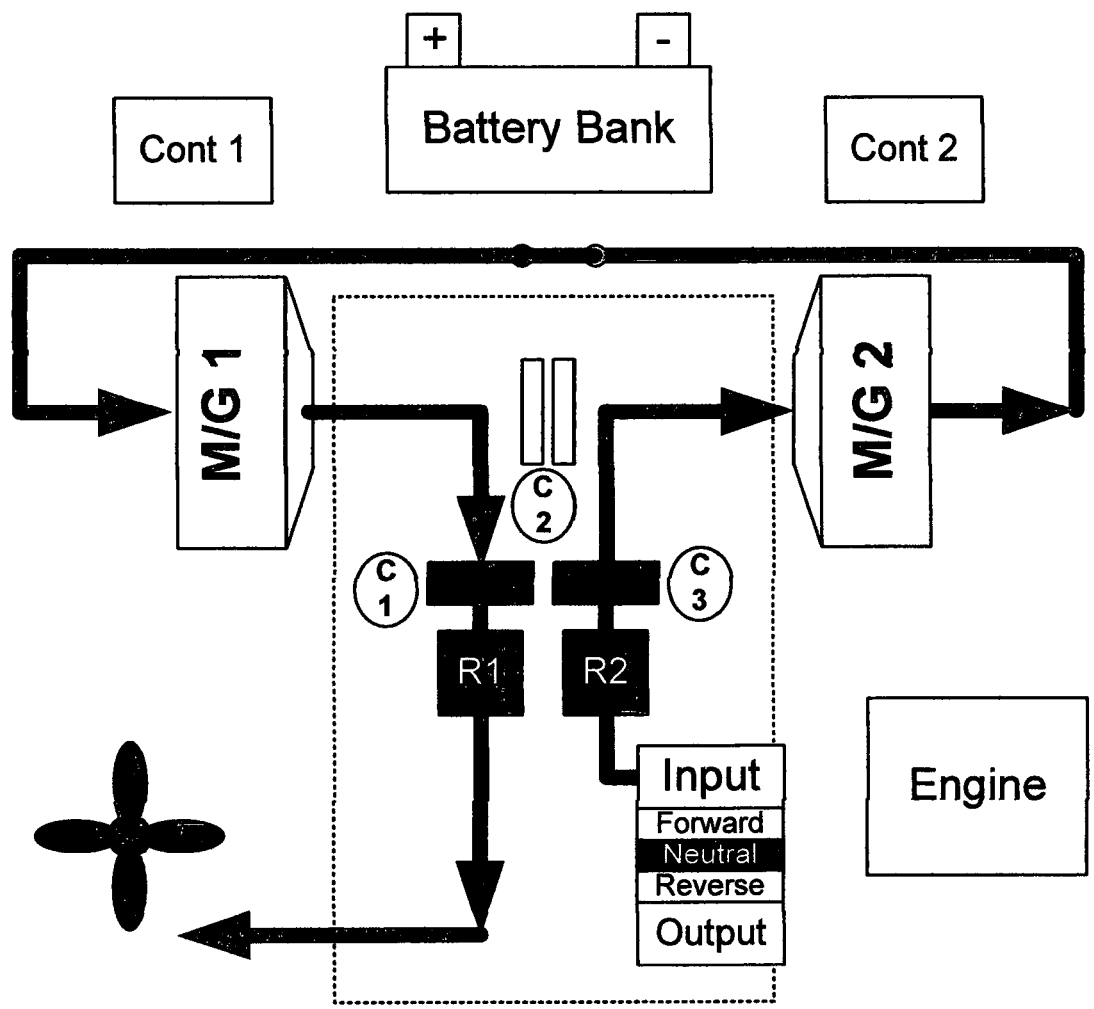
Fig 28, Diesel/electric mode

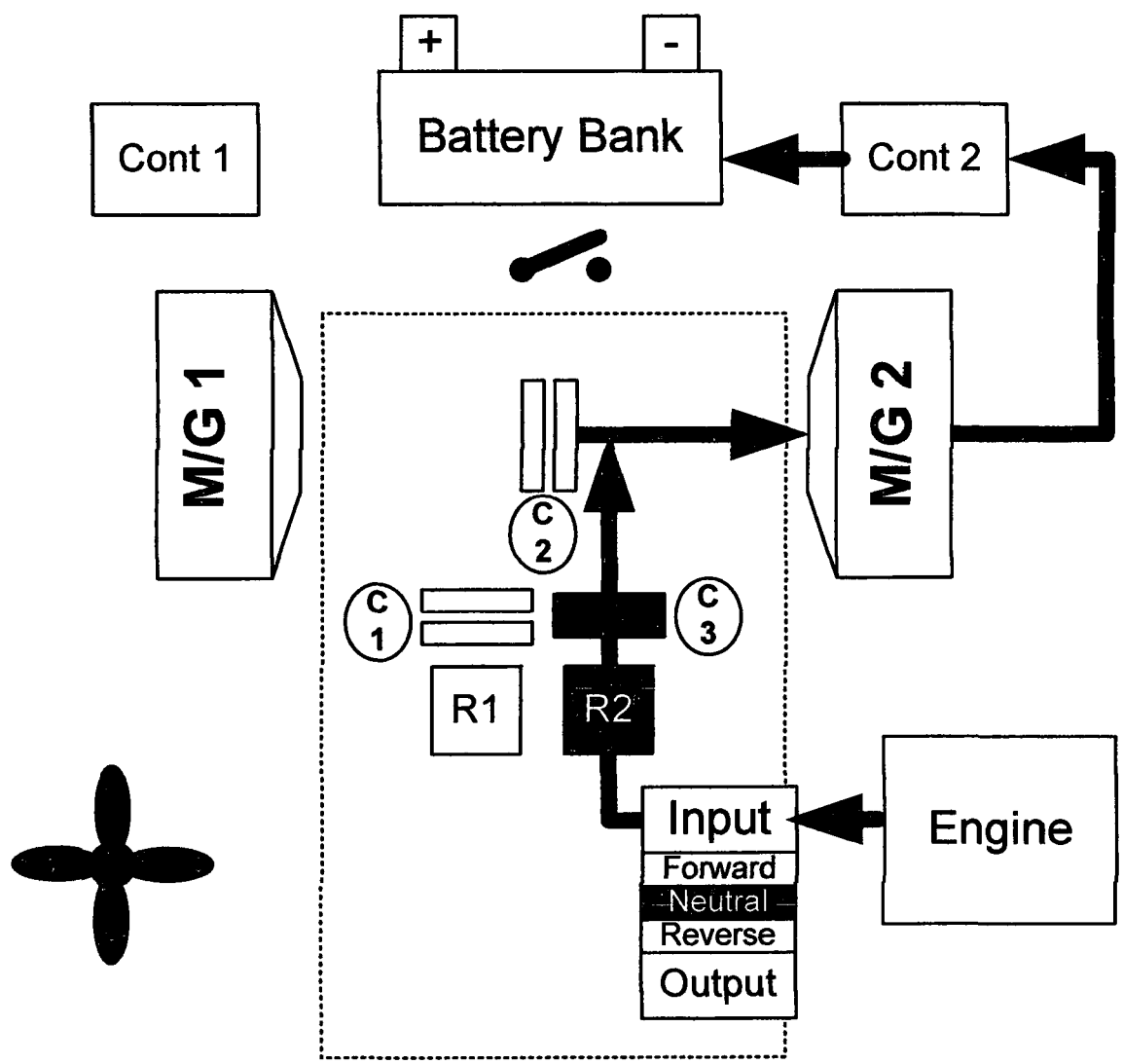
Fig 29, Stand alone generator mode 1

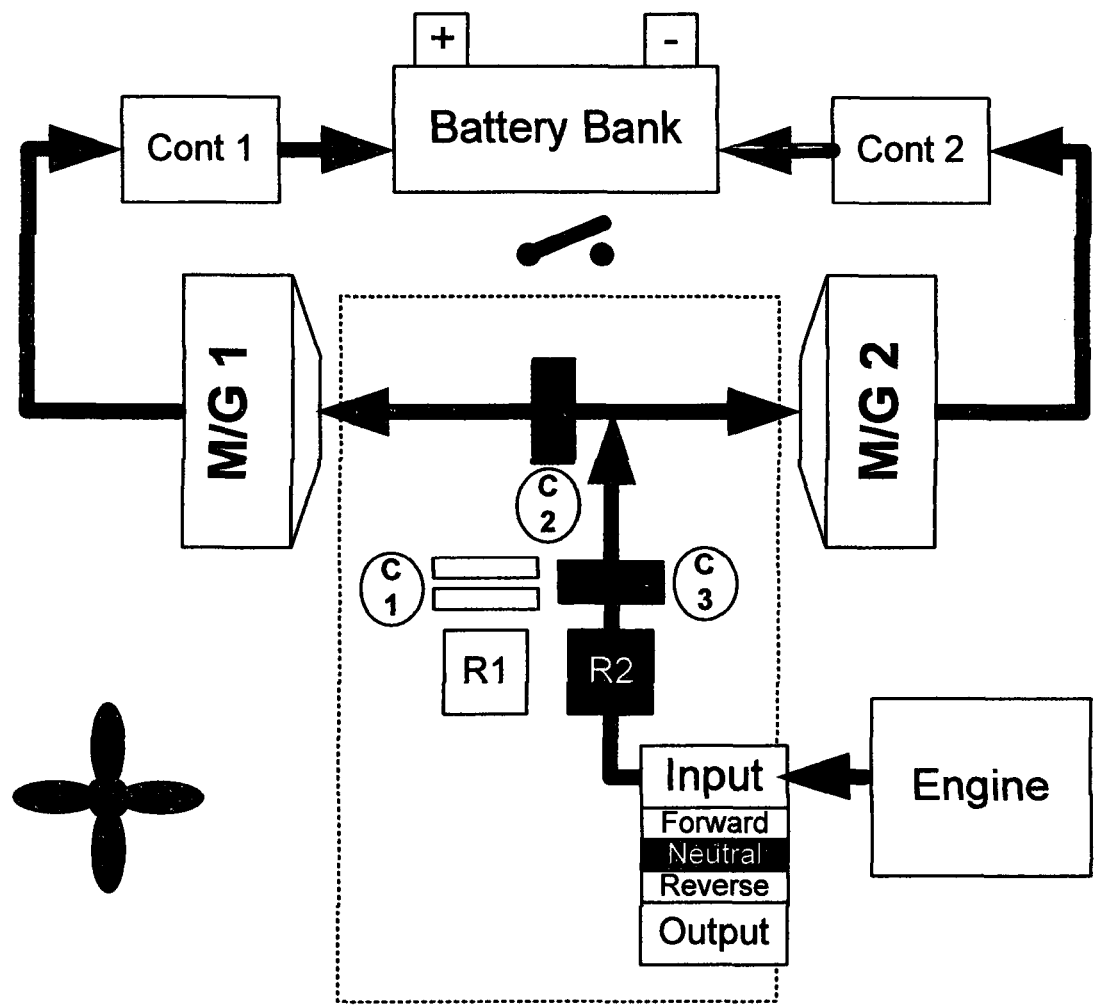
Fig 30, Stand alone generator mode 2

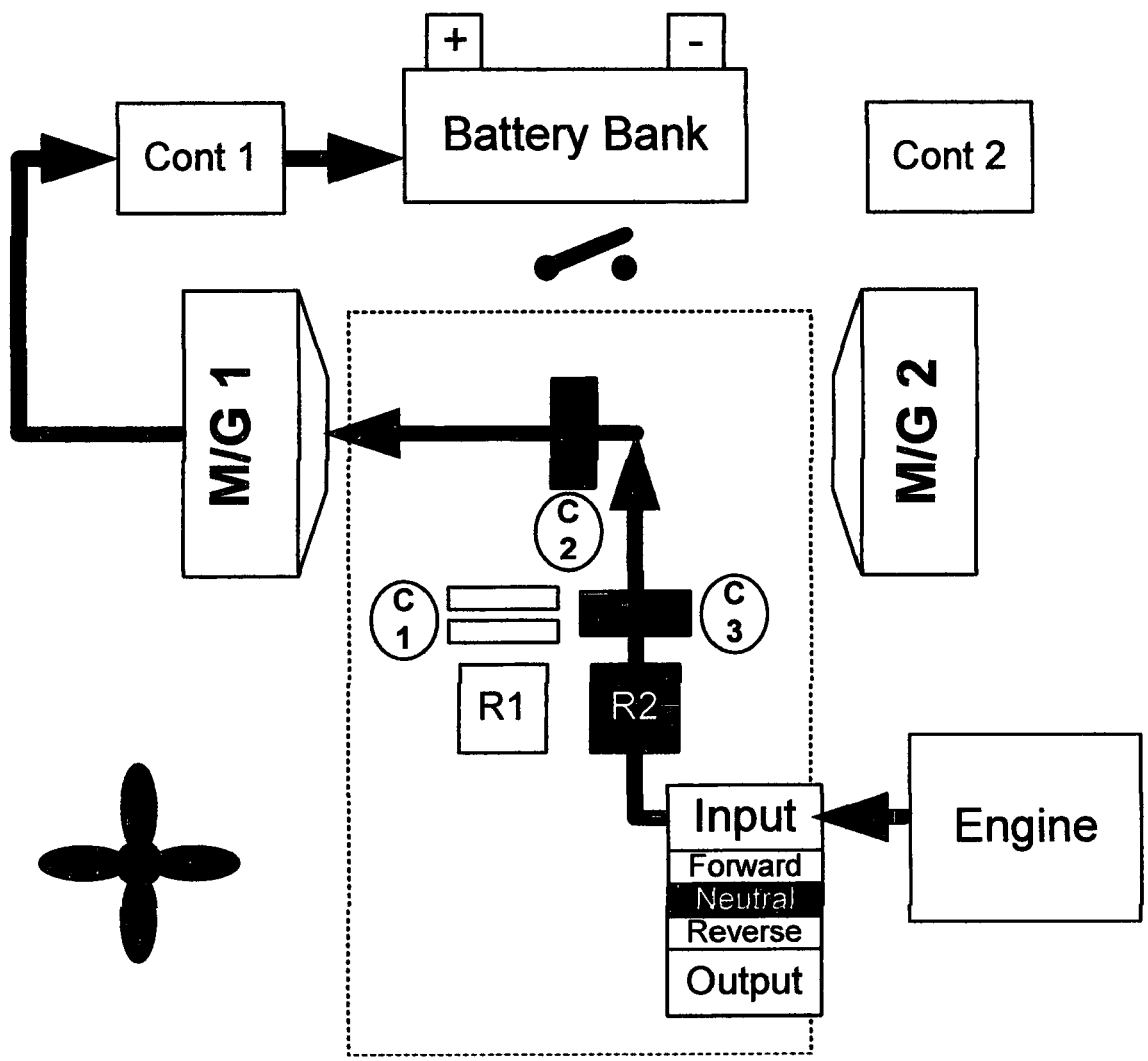
Fig 31, Stand alone generator mode 3

HYBRID POWER SYSTEM

CROSS-REFERENCE TO RELATED APPLICATIONS

This is the U.S. National Stage entry of International Application No. PCT/GB2015/000318, filed Nov. 24, 2015, which claims priority to GB Application No. 1420899.5, filed Nov. 25, 2014. These prior applications are incorporated herein by reference in their entirety.

BACKGROUND

Serial and parallel hybrid systems are well known and generally seek to better match engine performance characteristics, to the demands of operation, in order to improve efficiency with regard to fuel consumption and transmission of power.

It is known to provide a parallel hybrid system, especially for boats, in which an internal combustion is engine is connected to drive a propeller through a gearbox, and a motor/generator is connected to the gearbox input or output through a clutch. The propeller can be driven by the internal combustion engine when required. In addition the motor/generator can charge the battery when the engine is driving the propeller. The motor/generator (as powered by the battery) can drive the propeller when the engine is not working. Alternatively the propeller can be used to drive the motor/generator to charge a battery—e.g. if sailing.

Such known parallel hybrid systems fall into two types namely flywheel parallel hybrid systems in which a the engine output is connected via a clutch to a motor generator in series with and integral with a gearbox (see FIG. 1A) which drives a propeller shaft, or an external parallel hybrid in which an engine is connected to a gearbox which drives a propeller shaft through a clutch, and a motor generator is connected externally to the output of the gearbox between the gearbox and the clutch (see FIG. 1B). A problem with both these systems is that a failure of the clutch means that the engine alone cannot be used to drive the propeller. Also in flywheel parallel hybrid systems the motor generator is close coupled (often in a bespoke housing adding to cost) between the engine and gearbox making it difficult to service the motor generator, and the motor generator is subject to the heat of the engine and often needs cooling.

Diesel electric and serial hybrid systems are also well known, and have disadvantages and advantages over parallel hybrid systems.

BRIEF SUMMARY

The invention seeks to provide an improved hybrid power system, which can provide, inter alia, the advantages of diesel electric, serial hybrid and parallel hybrid systems, without the disadvantages.

According to the present invention there is provided a hybrid power system comprising:
 a) an internal combustion engine,
 b) a gear box having an input connectable to the engine and an output to drive a vehicle,
 c) a first power drive and take off releasably connectable to the gear box input,
 d) a second power drive and take off releasably connectable to the gear box output, and
 e) at least one motor/generator connected the first and/or second power drive and take off,
 f) a connecting clutch to releasably connecting the first and second power drive and take off, and
 g) a battery to power or be charged by the or each motor generator.

Preferably the system further comprises a control system to change the or each motor/generator into a motor or generator and to operate the connecting clutch and releasable connect the first power drive and take off and second power drive and take off to the gear box.

Preferably gearbox output shaft is connected to a propeller.

Preferably a first motor/generator is provided for the first power drive and take off, and a second motor/generator is provided for the second power drive and take off.

Preferably the first power drive and take off is releasably connectable to the gear box input by a first clutch.

Preferably the second power drive and take off is releasably connectable to the gear box input by a second clutch.

BRIEF DESCRIPTION OF THE DRAWINGS

An embodiment of the invention will now be described with reference to the accompanying drawings in which:

FIG. 4 shows a drive configuration of the block diagram of FIG. 2;

FIG. 5 shows another drive configuration of the block diagram of FIG. 2;

FIG. 6 shows another drive configuration of the block diagram of FIG. 2;

FIG. 7 shows another drive configuration of the block diagram of FIG. 2;

FIG. 8 shows another drive configuration of the block diagram of FIG. 2;

FIG. 9 shows another drive configuration of the block diagram of FIG. 2;

FIG. 10 shows another drive configuration of the block diagram of FIG. 2;

FIG. 11 shows another drive configuration of the block diagram of FIG. 2;

FIG. 12 shows another drive configuration of the block diagram of FIG. 2;

FIG. 13 shows another drive configuration of the block diagram of FIG. 2;

FIG. 14 shows another drive configuration of the block diagram of FIG. 2;

FIG. 15 shows another drive configuration of the block diagram of FIG. 2;

FIG. 16 shows another drive configuration of the block diagram of FIG. 2;

FIG. 17 shows another drive configuration of the block diagram of FIG. 2;

FIG. 18 shows another drive configuration of the block diagram of FIG. 2;

FIG. 19 shows another drive configuration of the block diagram of FIG. 2;

FIG. 20 shows another drive configuration of the block diagram of FIG. 2;

FIG. 21 shows another drive configuration of the block diagram of FIG. 2;

FIG. 22 shows another drive configuration of the block diagram of FIG. 2;

FIG. 23 shows another drive configuration of the block diagram of FIG. 2;

FIG. 24 shows another drive configuration of the block diagram of FIG. 2;

FIG. 25 shows another drive configuration of the block diagram of FIG. 2;

FIG. 26 shows another drive configuration of the block diagram of FIG. 2;

FIG. 27 shows another drive configuration of the block diagram of FIG. 2;

FIG. 28 shows another drive configuration of the block diagram of FIG. 2;

FIG. 29 shows another drive configuration of the block diagram of FIG. 2;

FIG. 30 shows another drive configuration of the block diagram of FIG. 2; and

FIG. 31 shows another drive configuration of the block diagram of FIG. 2.

DETAILED DESCRIPTION OF EXAMPLE EMBODIMENTS

Figure 1A:
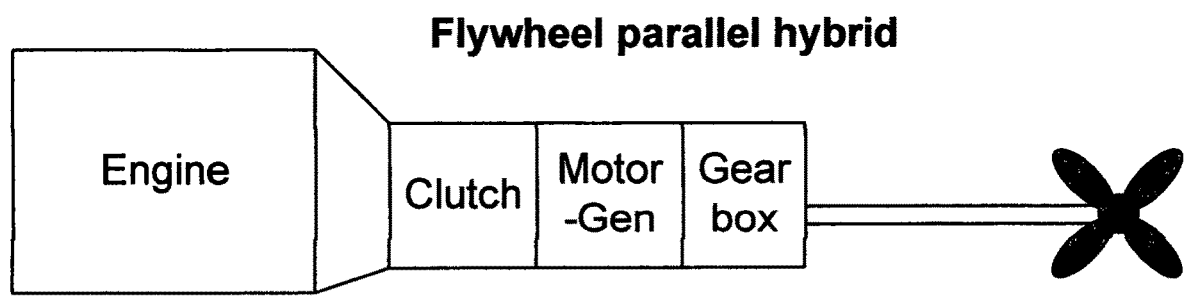
FIG. 1A shows a block diagram of a flywheel parallel hybrid.
Figure 1B:
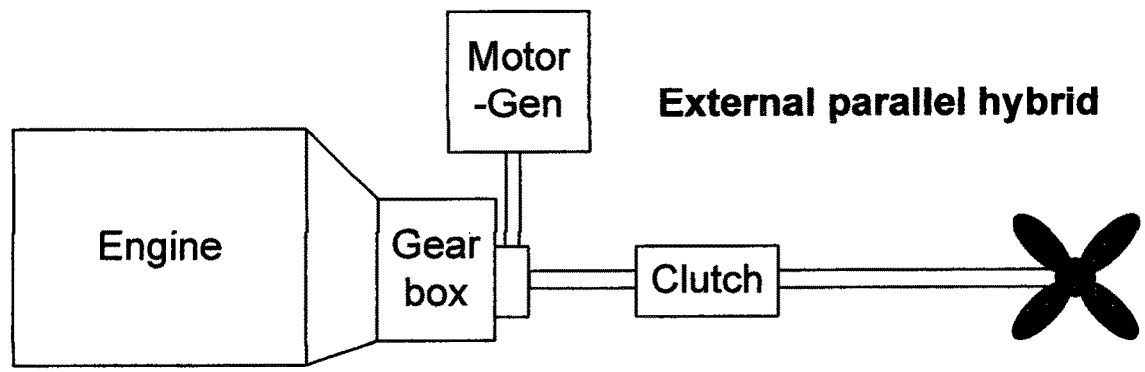
FIG. 1B shows a block diagram of an external parallel hybrid.
Figure 2:
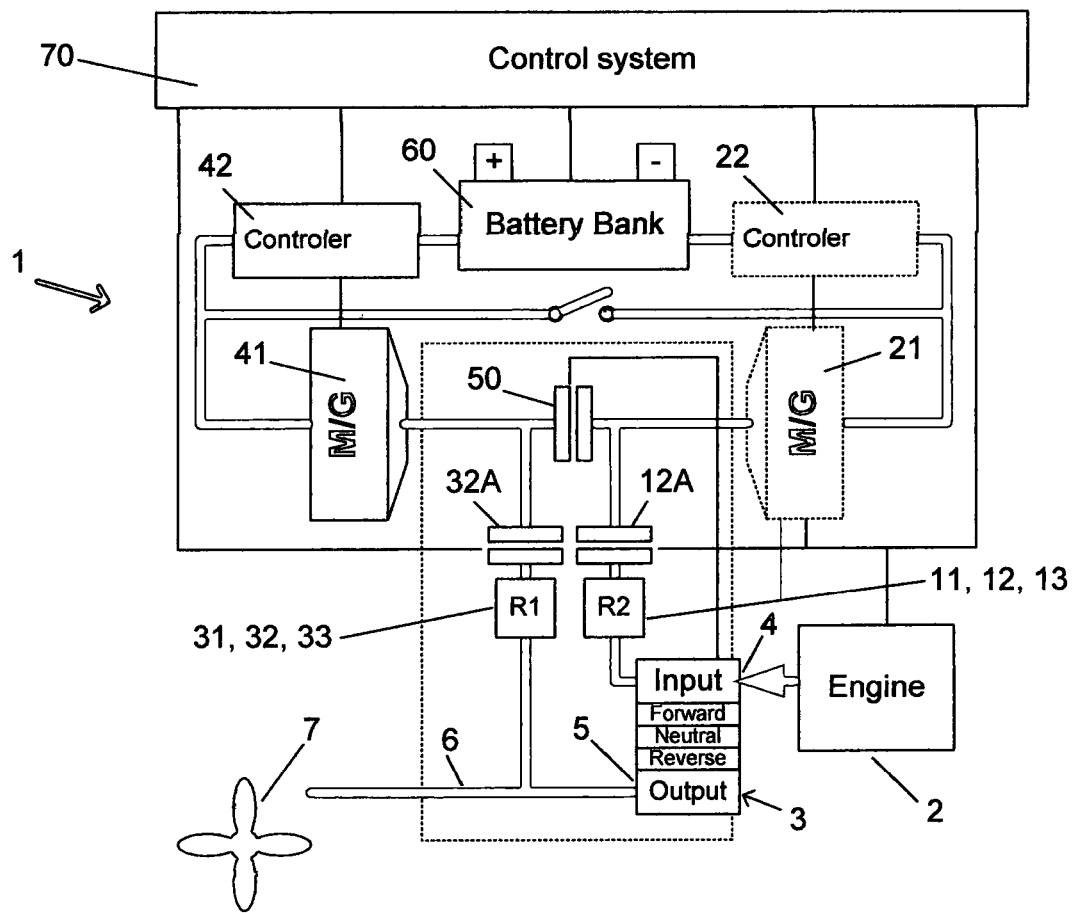
FIG. 2 shows a schematic block diagram.
Figure 3:
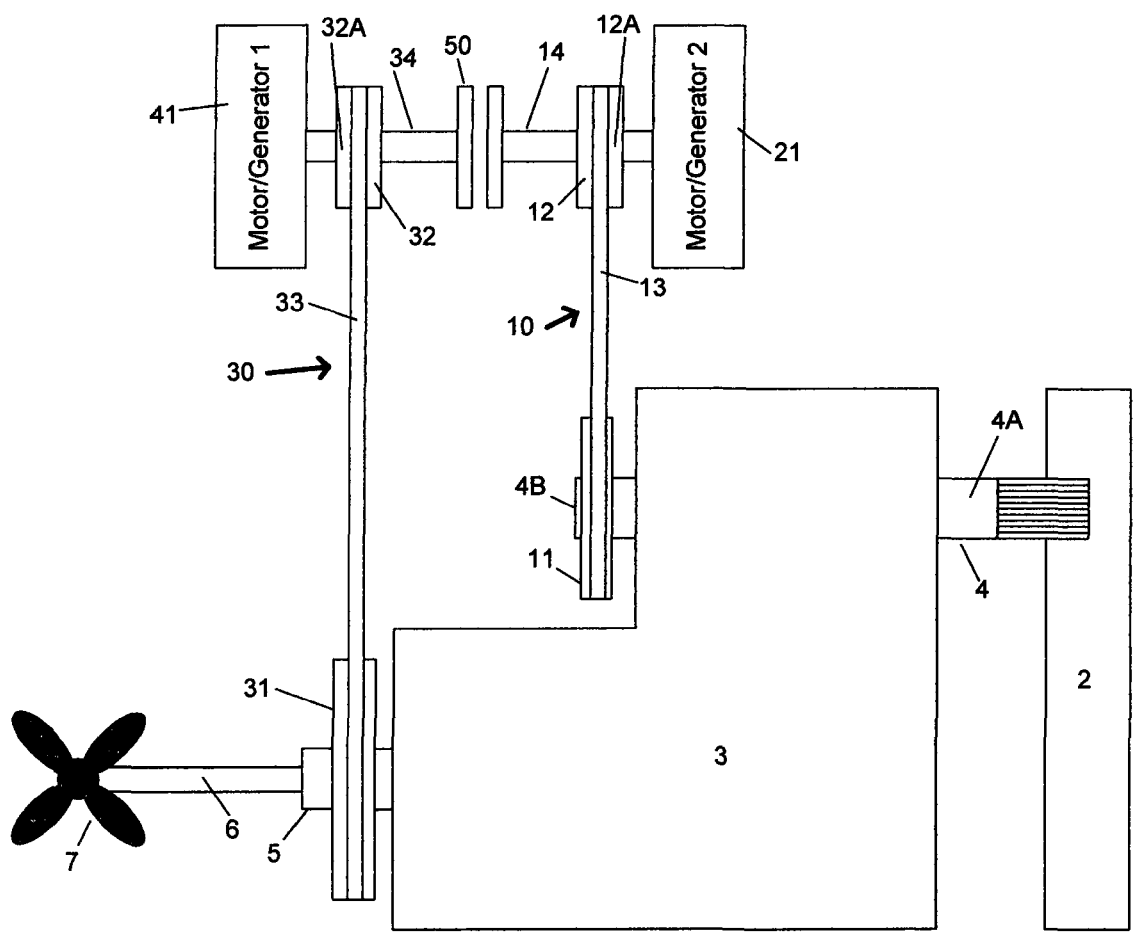
FIG. 3 shows a schematic drawing of FIG. 2 in a mechanical format.

Referring to FIGS. 2 and 3 there is shown a schematic block diagram of a hybrid power system 1.

System 1 has an internal combustion engine 2 (only part shown) such as a diesel engine in a boat.

A gear box 3 is provided. Gearbox 3 has an input shaft 4 connectable to the engine 2, and an output shaft 5 to drive a vehicle such as a boat through a shaft 6 driving a propeller or other propulsor. Input shaft 4 is of a type having a first end 4A to connect to and engine and second end 4B to connect to other devices. Gearbox 3 may typically have forward, neutral and reverse gear positions.

A first power drive and take off 10 is releasably connected to the gear box input second end 4B (or alternatively first end 4A). Power drive and take off 10 has a first pulley 11 (rotated by input 4B) connected to a second pulley 12 by a belt 13. Second pulley 12 has a first axial magnetic clutch 12A to releasably connect the second pulley 12 to a motor/generator shaft 14, whereby first power drive and take off 10 is releasably connected to the gear box input 4B.

A first motor/generator 21 is connected to drive shaft 14.

A second power drive and take off 30 is releasably connected to the gear box output 5. Power drive and take off 30 has a first pulley 31 (rotated by output 5) connected to a second pulley 32 by a belt 33. Second pulley 32 has a second axial magnetic clutch 32A to releasably connect the second pulley 32 to a motor/generator shaft 34, whereby second power drive and take off 30 is releasably connected to the gear box output 5

A second motor/generator 41 is connected to drive shaft 34.

A connecting clutch in the form of an electromagnetic clutch 50 is provided to releasably connect the first and second power drive and take offs 10,30 by releasably connecting shafts 14 and 34 together.

A battery 60 is provided to power or be charged by each motor/generator 21,41. Battery also powers the clutches 12A,32A and 50.

A control system 70 controls each motor/generator 21,41 with an associated power controller 22,42. System 70 configures each power controller 22,42 into either a motor or generator mode. System 70 also controls clutches 12A,32A and 50. In motor mode power controllers 22,42 set the speed or torque of the motors 21,41. In generate mode power controllers 22,42 set the torque loading applied by generators 21,41 to shaft 14,34.

The following FIGS. 4 to 31 show different drive configurations/functions (shown by "dark shading" of different components) which are possible with the invention shown in FIGS. 2 and 3. Drive ratio R1 is determined by the relative sizes of pulleys 31 and 32. Drive ratio R2 is determined by the relative sizes of pulleys 11 and 12. Drive ration are typically different and are selected to provide optimum performance in the varying modes of operation.

As shown in FIG. 4, motor generators 21,41 can be isolated from engine 2 and gearbox 3 by disengaging clutches 12A,32A, whereby the engine 2 and gearbox 3 can be used alone to drive propeller 7 forward or in reverse.

As shown in FIG. 5, with gearbox 3 in neutral, propeller 7 can be driven by engine 3 by engaging clutches 12A,50, 32A. This configuration may be used if gearbox 3 should fail. Drive ratio achieved from engine 2 to shaft 6 is R1*R2.

As shown in FIG. 6, with gearbox 3 in neutral, motor generator 21 as powered by battery 60 can be used to start engine if its starter motor fails by engaging clutch 12A only, and using motor/generator 21 in motor mode.

As shown in FIG. 7, with engine 2 stopped and gearbox 3 in neutral, motor generator 41 as powered by battery 60 can be used to drive propeller 7 by engaging clutch 32A only. Drive ratio from motor 41 to shaft 6 is R1.

As shown in FIG. 8, with engine 2 stopped and gearbox 3 in neutral, motor generator 21 as powered by battery 60 can be used to drive propeller 7 by engaging clutch 32A and 50 only. Drive ratio from motor 41 to shaft 6 is R1.

As shown in FIG. 9, motor generators 21 and 41 as powered by battery 60 can be used to drive propeller 7 by engaging clutch 32A and 50 only. Drive ratio from motors 21 and 41 to shaft 6 is R1.

As shown in FIG. 10, engine 2 can be used to drive propeller 7 through gearbox 3. Engine 2 also charges battery 60 through motor/generator 41 with clutch 32A only engaged. Ratio from engine 2 crankshaft to generator 41 is gearbox 3 forward ratio*R1.

As shown in FIG. 11, engine 2 can be used to drive propeller 7 through gearbox 3. Engine 2 also charges battery 60 through motor/generator 41 with clutch 12A and 50 only engaged. Ratio of drive from engine 2 crankshaft to generator 41 is R2.

As shown in FIG. 12, engine 2 can be used to drive propeller 7 through gearbox 3. Engine 2 also charges battery 60 through motor/generator 21 with clutch 12A only engaged. Ratio of drive from engine 2 crankshaft to generator 21 is R2

As shown in FIG. 13, engine 2 can be used to drive propeller 7 through gearbox 3. Engine 2 also charges battery 60 through motor/generator 21 with clutch 32A and 50 only engaged. Ratio of drive from engine 2 crankshaft to generator 21 is gearbox 3 forward ratio*R1.

As shown in FIG. 14, engine 2 can be used to drive propeller 7 through gearbox 3. Engine 2 also charges battery 60 through motor/generators 21 and 41 with clutch 12A and 50 only engaged. Ratio of drive from engine 2 crankshaft to generators 21 and 41 is R2

As shown in FIG. 15, engine 2 can be used to drive propeller 7 through gearbox 3. Engine 2 also charges battery 60 through motor/generators 21 and 41 with clutch 32A and 50 only engaged. Ratio of drive from engine 2 crankshaft to generators 21 and 41 is gearbox 3 forward ratio*R1.

As shown in FIG. 16 engine 2 can be used to drive propeller 7 through gearbox 3. Engine 2 also charges battery 60 through motor/generator 21 with clutch 12A engaged, and engine 2 also charges battery 60 through motor/generator 41 with clutch 32A engaged. Ratio of drive from engine 2 crankshaft to generator 21 is R2. Ratio of drive from engine 2 crankshaft to generator 41 is gearbox 3 forward ratio*R1.

As shown in FIG. 17, engine 2 can be used to drive propeller 7 through gearbox 3. Propeller 7 is also driven by motor/generator 41 as powered by battery 60 with clutch 32A only engaged. Ratio of drive from motor 41 to shaft 6 is R1.

As shown in FIG. 18, engine 2 can be used to drive propeller 7 through gearbox 3. Propeller 7 is also driven by motor/generator 41 as powered by battery 60 with clutch 12A and 50 only engaged. Ratio of drive from motor 41 to shaft 6 is R2*gearbox 3 forward ratio.

As shown in FIG. 19, engine 2 can be used to drive propeller 7 through gearbox 3. Propeller 7 is also driven by motor/generator 21 as powered by battery 60 with clutch 12A only engaged. Ratio of drive from motor 21 to shaft 6 is R2*gearbox 3 forward ratio.

As shown in FIG. 20, engine 2 can be used to drive propeller 7 through gearbox 3. Propeller 7 is also driven by motor/generator 21 as powered by battery 60 with clutch 32A and 50 only engaged. Ratio of drive from motor 21 to shaft 6 is R1.

As shown in FIG. 21 engine 2 can be used to drive propeller 7 through gearbox 3. Propeller 7 is also driven by motor/generators 21 and 41 as powered by battery 60 with clutch 12A and 50 only engaged. Ratio of drive from motors 21 and 41 to shaft 6 is R2*gearbox 3 forward ratio.

As shown in FIG. 22 engine 2 can be used to drive propeller 7 through gearbox 3. Propeller 7 is also driven by motor/generators 21 and 41 as powered by battery 60 with clutch 32A and 50 only engaged. Ratio of drive from motors 21 and 41 to shaft 6 is R1.

As shown in FIG. 23 engine 2 can be used to drive propeller 7 through gearbox 3. Propeller 7 is also driven by motor/generators 21 and 41 as powered by battery 60 with clutches 12A and 32A only engaged. Ratio of drive from motor 21 to shaft 6 is R2*gearbox 3 forward ratio. Ratio of drive from motor 41 to shaft 6 is R1.

As shown in FIG. 24, with engine 2 stopped and gear box 3 in neutral freewheeling propeller 7 (for example in a craft driven by sails) can be used to charge battery 60 through motor/generator 41 with clutch 32A only engaged. Ratio of drive from propeller 7 to generator 41 is R1.

As shown in FIG. 25, propeller 7 can be used to charge battery 60 through motor/generator 21 with clutch 32A and 50 only engaged. Ratio of drive from propeller 7 to generator 21 is R1.

As shown in FIG. 26, propeller 7 can be used to charge battery 60 through motor/generators 21 and 41 with clutch 32A and 50 only engaged. Ratio of drive from propeller 7 to generators 21 and 42 is R1.

As shown in FIG. 27, engine 2 can drive generator 21 through R2 and clutch 12A to charge battery bank 60. Energy from battery bank 6 can then be used to power motor 41 and drive propeller 7 through clutch 32A R2 and shaft 6. This provides a serial hybrid implementation for the system (Engine 3 not mechanically connected to the propeller shaft 6).

As shown in FIG. 28, engine 2 can be used to provide electrical power from motor generator 21 with clutch 12A engaged, electrical energy produced is used to drive propeller 7 by motor 41 with clutch 32A engaged. This is a diesel/electric drive implementation for the system.

As shown in FIG. 29, engine 2 can be used charge battery 60 through motor/generator 21 with clutch 12A only engaged. Ratio of drive from engine 3 to generator 21 is R2.

As shown in FIG. 30, engine 2 can be used charge battery 60 through motor/generators 21 and 41 with clutches 12A and 50 only engaged. Ratio of drive from engine 3 to generators 21 and 41 is R2.

As shown in FIG. 31, engine 2 can be used charge battery 60 through motor/generator 41 with clutch 12A and 50 only engaged. Ratio of drive from engine 3 to generator 41 is R2.

The invention can be created using known engines and gearboxes with known motor generators, batteries, control systems, and clutch systems, and avoids the problems hitherto associated with known serial and parallel hybrid systems.

The various configurations possible as shown in FIGS. 4 to 31 allow the hybrid system to run the diesel engine at all times applying the load on the engine for given revs to maximise fuel consumption. The two drive ratios of R1 and R2 enable more optimal loading of the engine in the various operating modes thus achieving greater operational efficiency than current state of the art single ratio Parallel/serial hybrid systems can achieve.

The invention may take a form different to that specifically described above. For example only motor generator 41 could be provided, although not all the examples given in FIGS. 4 to 31 could be performed. Instead of pulleys and a belt, drive ratios R1 and R2 can be achieved by numerous type of transmission types, e.g. gears, chain drive, hydraulic drive etc. Clutches 12A, 32A and 50 can be achieved by numerous clutching mechanisms e.g. electromagnetic clutches, multiplate clutches, cone clutches etc.

Further modifications will be apparent to those skilled in the art without departing from the scope of the present invention.

The invention claimed is:

1. A marine hybrid power system comprising:
   an internal combustion engine,
   a gear box having an input connectable to the engine and an output shaft to drive a marine vessel,
   a first power drive and take off external of the gear box and connected to the gear box input to provide a releasable drive connection to and from the gear box input,
   at least one motor/generator connectable to the first power drive and take off,
   and
   a battery electrically connected to the at least one motor/generator to power or be charged by the at least one motor/generator wherein:
   the gear box provides forward, neutral and reverse operation;
   a second power drive and take off external of the gearbox is connected to the gear box output shaft to provide a releasable drive connection to and from the gear box output shaft;
   said at least one motor/generator is connectable to a respective one of the first and second power drive and take offs;
   a connecting clutch provides a releasable drive connection between the first and second power drive and take offs; and
   the gear box input is selectively connected to the gear box output shaft by controlling said releasable drive connections, bypassing the gear box, and the at least one motor generator is selectively connected to the gear box input or output shaft, bypassing the gear box.

2. A system according to claim 1, further comprising a control system operable to change the at least one motor/generator into a motor or generator and to control said releasable drive connections.

3. A system according to claim 1, wherein the gear box output shaft is connected to a propulsor.

4. A system according to claim 1, wherein the at least one motor/generator includes a first motor/generator connected to the first power drive and take off, and a second said motor/generator connected to the second power drive and take off.

5. A system according to claim 1, wherein the first power drive and take off is releasably connectable to the gear box input by a first clutch.

6. A system according to claim 1, wherein the second power drive and take off is releasably connectable to the gear box output shaft by a second clutch.

7. A boat comprising the hybrid power system of claim 1.

8. A system according to claim 1, wherein the first power drive and take off has a first drive ratio R1 and the second power drive and take off has a second drive ratio R2 that is different to the first drive ratio R1.

9. A system according to claim 1, wherein the or each power drive and take off comprises a first pulley connected to the gear box input or output shaft, a second pulley connectable to a respective said motor generator and a drive belt providing a drive connection between the first and second pulleys.

10. A system according to claim 1, wherein the or each power drive and take off comprises gears.

11. A system according to claim 1, wherein the or each power drive and take off comprises a chain drive.

* * * * *